(12) United States Patent
Shimizu et al.

(10) Patent No.: US 6,390,230 B1
(45) Date of Patent: May 21, 2002

(54) ELECTRIC POWER STEERING APPARATUS

(75) Inventors: Yasuo Shimizu; Yasuharu Ohyama; Katsuji Watanabe; Shigeru Yamawaki; Atsuhiko Yoneda; Yasuhiro Terada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/679,915

(22) Filed: Oct. 5, 2000

(30) Foreign Application Priority Data

| Oct. 6, 1999 | (JP) | 11-286038 |
|---|---|---|
| Nov. 19, 1999 | (JP) | 11-330648 |
| Nov. 26, 1999 | (JP) | 11-336837 |
| Dec. 7, 1999 | (JP) | 11-347893 |

(51) Int. Cl.$^7$ ............................................. B62D 3/12
(52) U.S. Cl. ............................................. 180/444; 74/422
(58) Field of Search ...................... 180/443, 444, 180/446, 428; 74/10.39, 29, 422, 498

(56) References Cited

U.S. PATENT DOCUMENTS

| 4,116,085 A | * | 9/1978 | Bishop | 74/422 |
|---|---|---|---|---|
| 4,222,282 A | | 9/1980 | Taig | |
| 4,382,389 A | * | 5/1983 | Namiki et al. | 280/93.514 |
| 4,572,314 A | | 2/1986 | Anguera | |

FOREIGN PATENT DOCUMENTS

| JP | 59017063 | | 1/1984 | |
|---|---|---|---|---|
| JP | 59020770 | | 2/1984 | |
| JP | 59020771 | | 2/1984 | |
| JP | 61004797 | | 1/1986 | |
| JP | 06221940 | | 8/1994 | |
| JP | 07215224 A | * | 8/1995 | ........... B62D/03/12 |
| JP | 09193815 | | 7/1997 | |

\* cited by examiner

*Primary Examiner*—Kevin Hurley
(74) *Attorney, Agent, or Firm*—Merchant & Gould, P.C.

(57) ABSTRACT

An electric power steering apparatus having a motor for producing assist torque according to the steering torque, and a rack and pinion mechanism for transferring torque assistance to the rack shaft. The pinion and rack of the rack and pinion mechanism are both helical gears, and transfer high torque to the rack shaft. The helical gears have a curved arc tooth profile. The teeth of a curved arc tooth profile gear set mesh with contact between convex and concave surfaces. The contact area is therefore increased and contact pressure is decreased compared with involute teeth. Surface fatigue strength, bending strength, and bending fatigue strength are thus greater compared with involute teeth. The combined steering torque and assist torque is efficiently transferred to the rack shaft, and durability is sufficient to withstand torque loads from motor inertia.

12 Claims, 30 Drawing Sheets

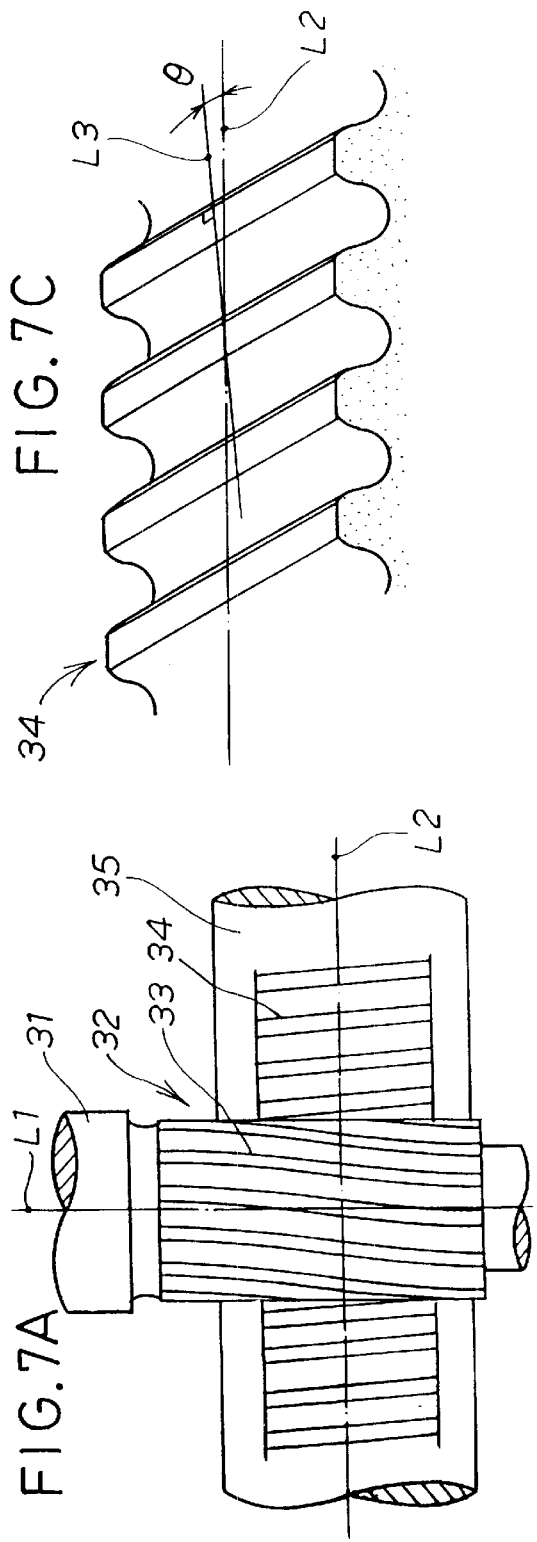
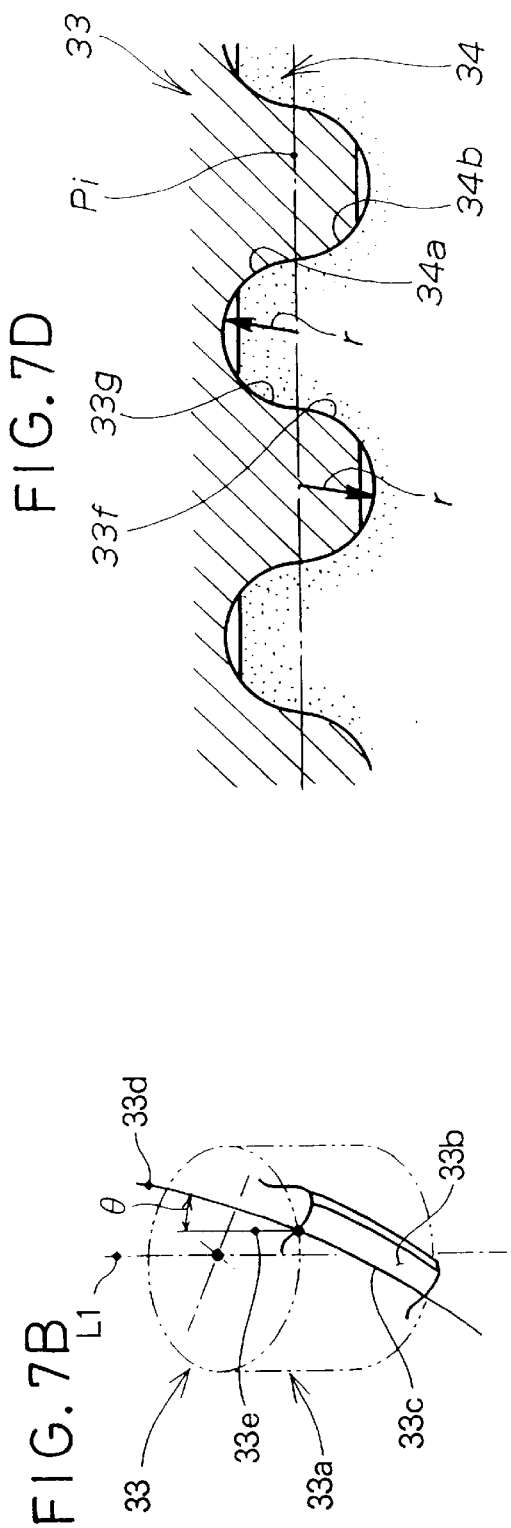

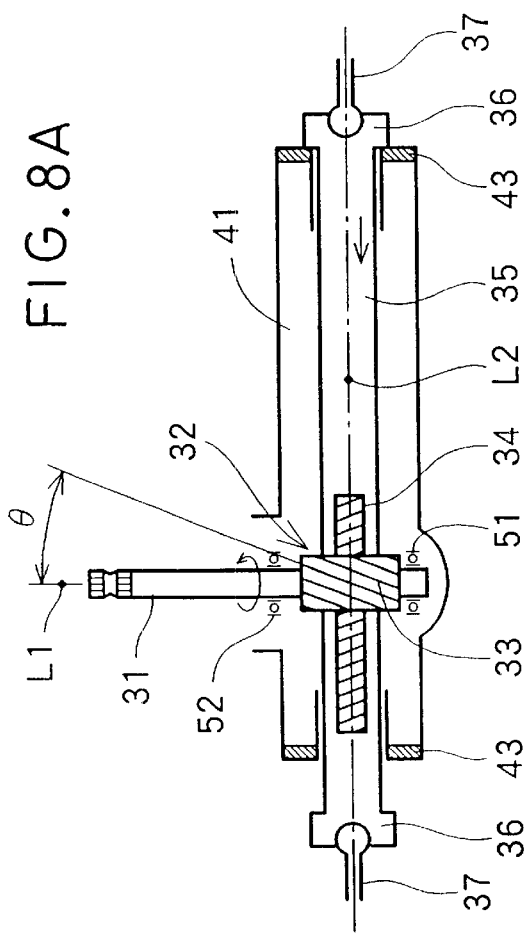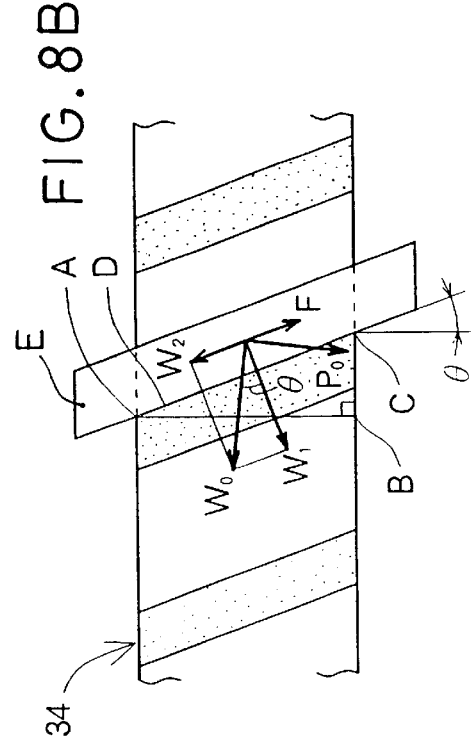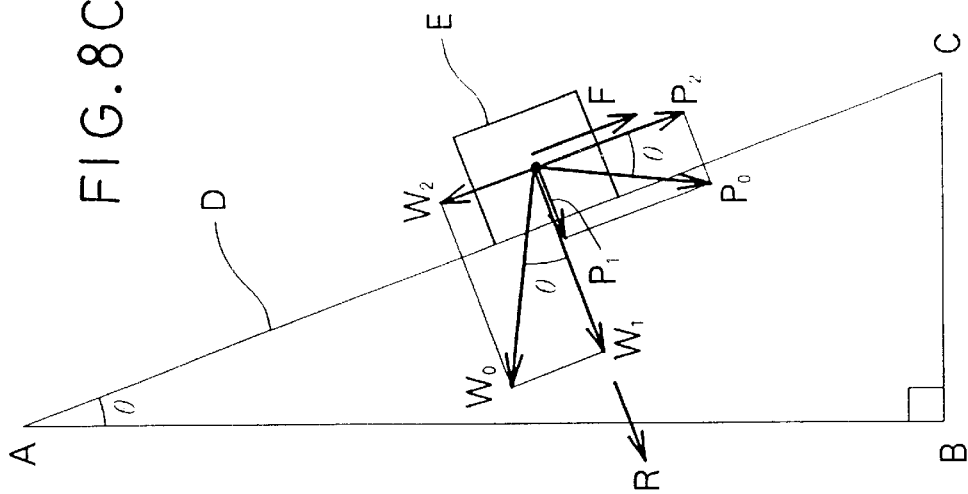

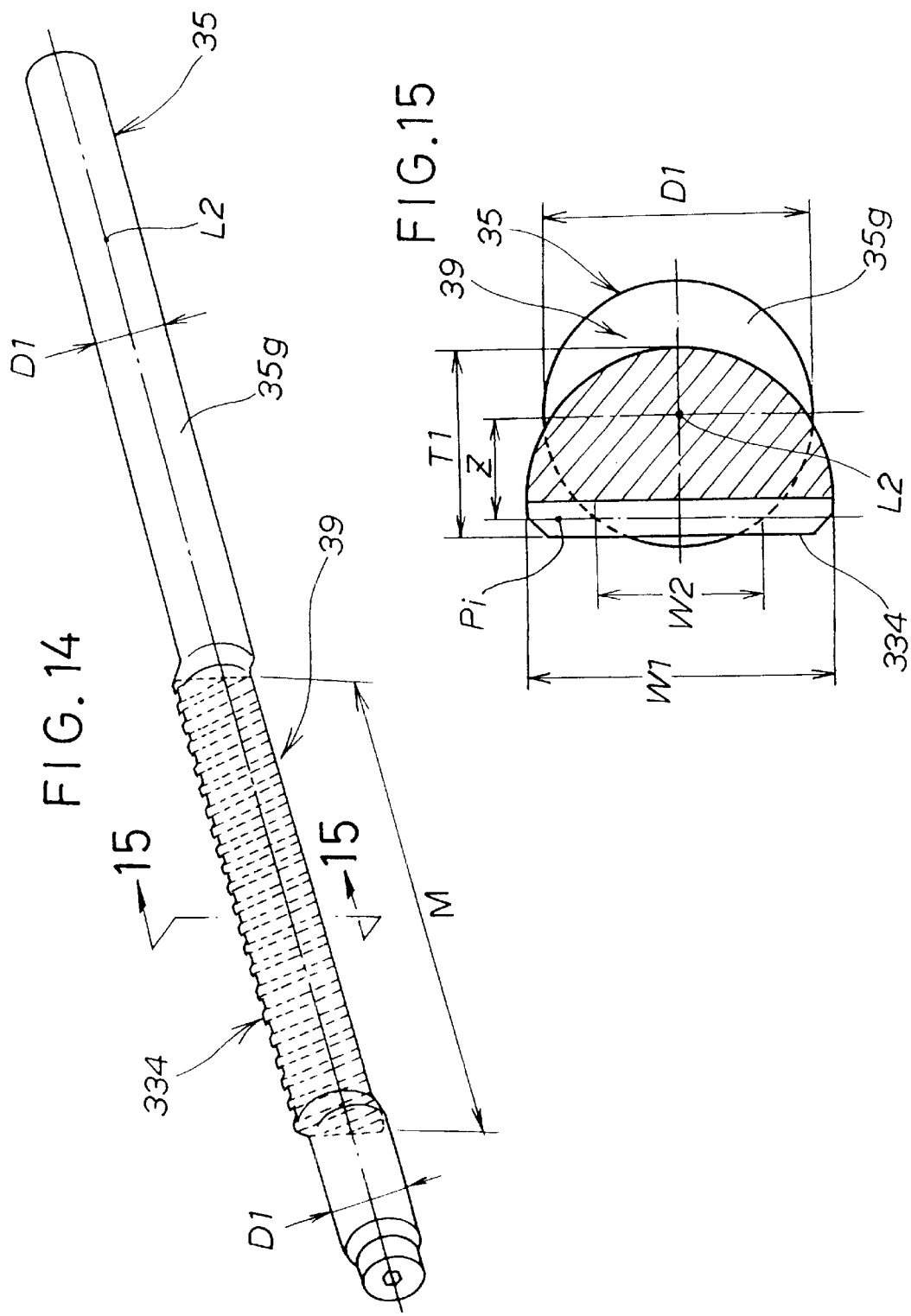

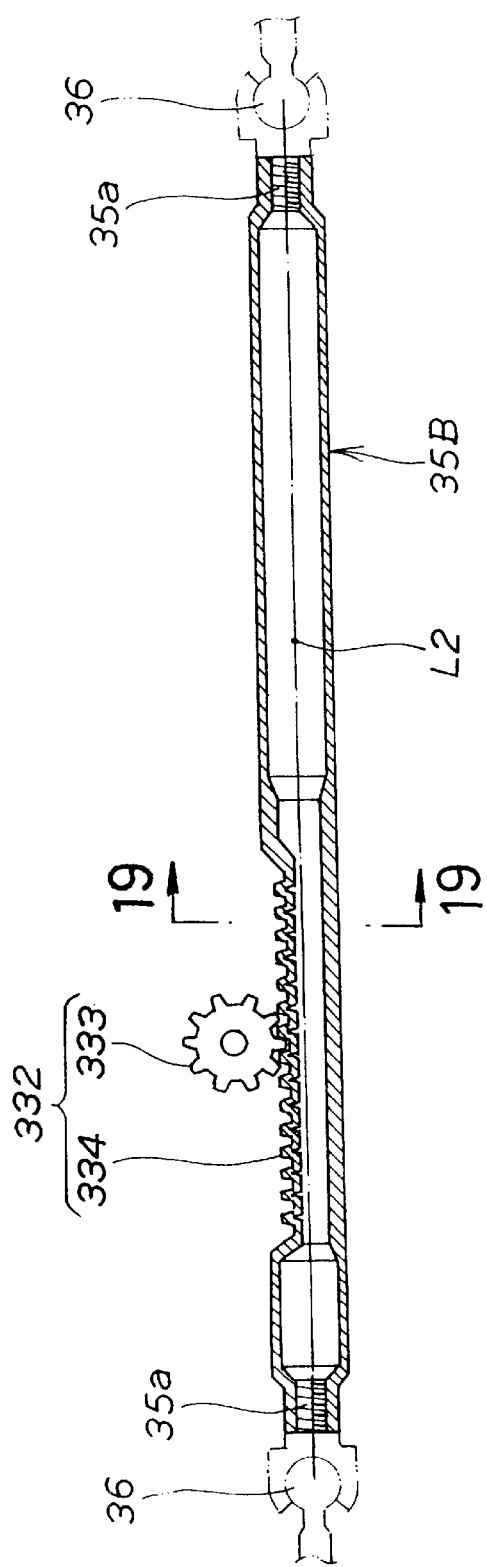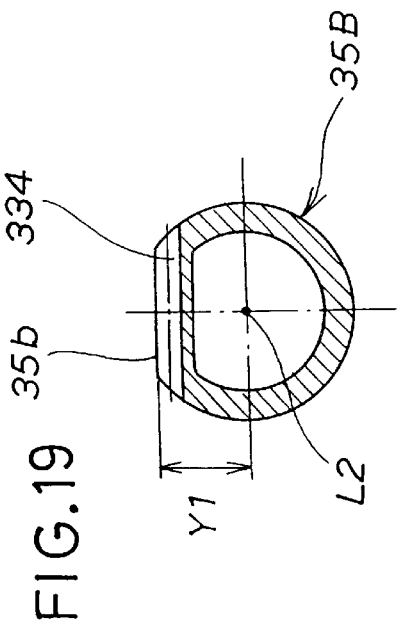

FIG. 20
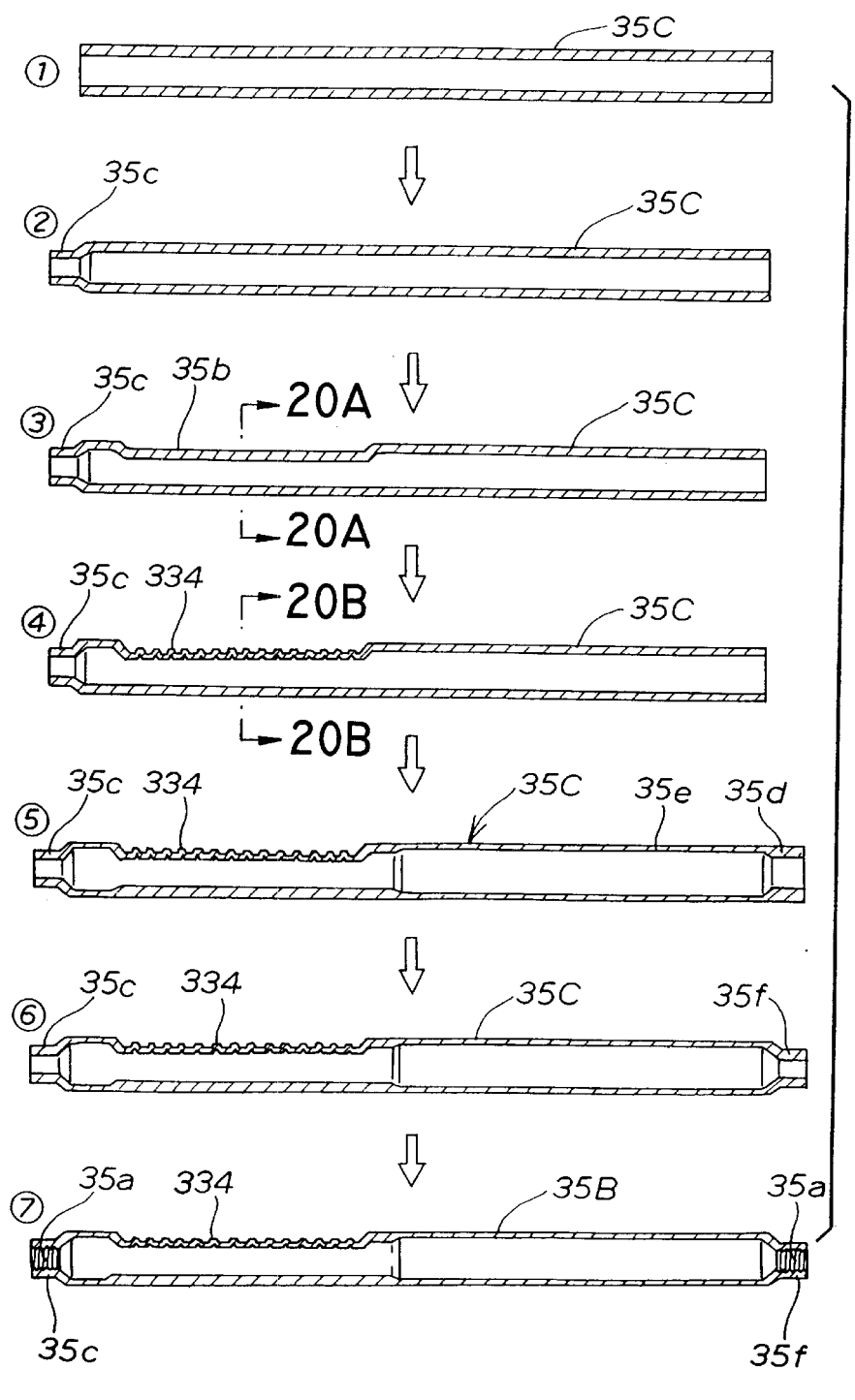
FIG. 20A
FIG. 20B

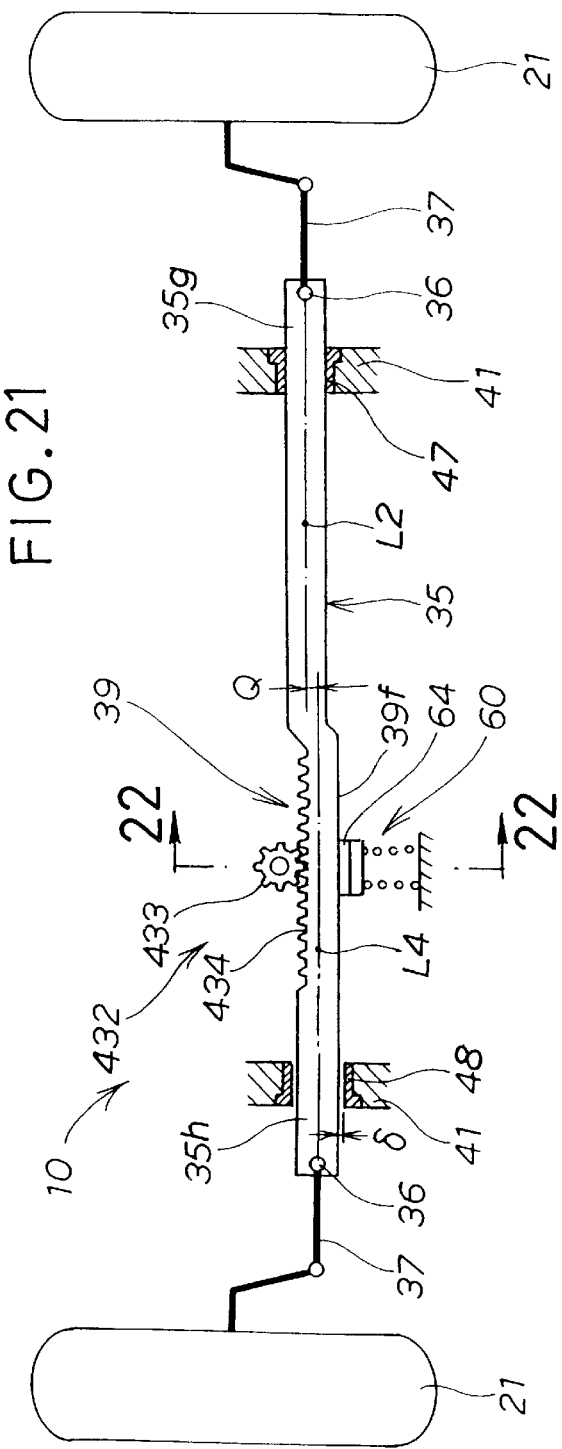

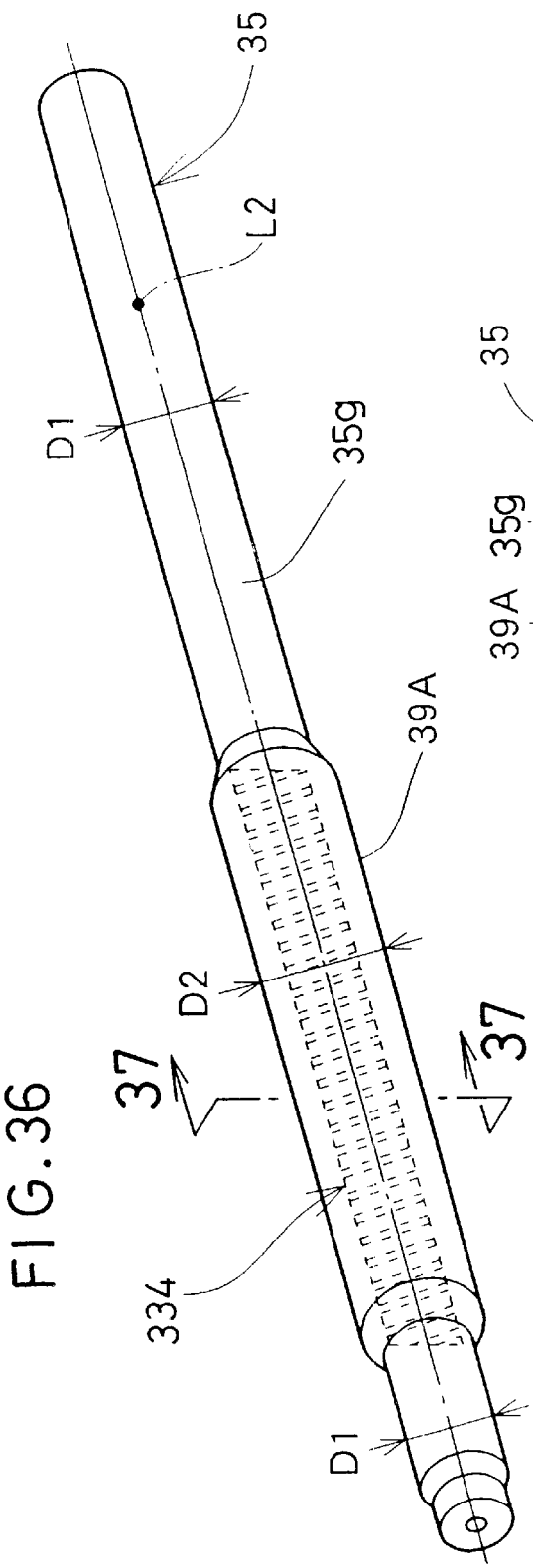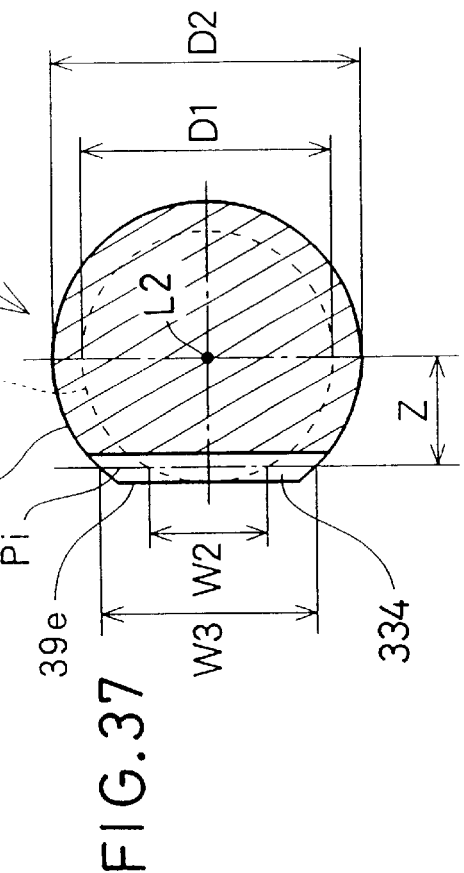
FIG. 36
FIG. 37

ELECTRIC POWER STEERING APPARATUS

BACKGROUND OF THE INVENTION

1. Field of the Invention

The present invention relates to an electric power steering apparatus, and more particularly to an improvement in a rack and pinion mechanism used in such an electric power steering apparatus.

2. Description of the Related Art

Electric power steering systems are commonly used to make steering easier by reducing a force needed to turn a steering wheel (referred to as the steering force below). Electric power steering systems use an electric motor to produce assist torque according to the steering torque, and transfer this assist torque to the rack and pinion mechanism of the steering system, as taught in, for example, Japanese Patent Laid-Open Publication (kokai) No. HEI-9-193815.

More specifically, the electric power steering system produces assist torque according to the steering torque by means of an electric motor, transfers this assist torque through small and large bevel gears to a rack and pinion mechanism comprising a pinion and rack shaft, and steers the steering wheels by means of this rack and pinion mechanism. The rack shaft is a round rod having a rack formed thereon at the place opposite the pinion. The pinion and rack both have involute teeth.

An automotive steering system also usually has a stopper mechanism for limiting the maximum turning angle of the steering wheels. More specifically, this stopper mechanism has a rack end stopper attached at each longitudinal end of the housing in which the rack shaft is slidably disposed, and a ball joint, for example, is attached to each end of the rack shaft. When the rack shaft slides a specific distance, the ball joint contacts the rack end stopper. The maximum turning angle of the steering wheels is thus limited by limiting the movement of the rack shaft.

The rack and pinion of the rack and pinion mechanism used in the electric power steering apparatus taught in Kokai HEI-9-193815 uses spur or helical gears. The tooth profile of these spur or helical gears is also involute. Helical gears are widely used in high load, high speed gear applications because they mesh more smoothly than spur gears and produce less vibration and noise.

Small, high load helical gears are also used in the rack and pinion mechanism of the above-noted electric power steering apparatus. Helical gears produce a constant thrust corresponding to torque because the tooth profile has a specific helix angle. The thrust produced during normal steering conditions is determined by the total torque acting on the pinion, that is, the steering torque applied by the driver plus the assist torque produced by the motor.

Once the rack shaft slides the above-noted specific distance, further movement is restricted by the stopper mechanism. When the rack shaft is thus stopped, the total torque acting on the pinion is greater than during normal steering, and high thrust corresponding to this total combined torque is at work. Note that maximum combined torque and maximum thrust are produced at this time.

The power transfer section, bearings, housing, and other components of the electric power steering apparatus must also be strong enough to withstand this maximum thrust. Increasing the strength of these components requires relatively high quality materials and relatively large components. The electric power steering apparatus itself thus becomes larger and more expensive, leaving room for improvement.

In the above-noted electric power steering apparatus the assist torque (assist force) produced by the motor is increased by a reduction mechanism comprising small and large bevel gears, and the increased assist force is converted to thrust assistance by the rack and pinion mechanism. The assist force of the motor is converted to rack output at the combined efficiency $\eta_T = \eta_G \times \eta_R$ where $\eta_G$ is the transfer efficiency of the reduction mechanism and $\eta_R$ is the transfer efficiency of the rack and pinion mechanism. The product of motor assist force and $(1-\eta_T)$ is output loss, which is converted to parts wear and heat, and contributes to a drop in system durability and output due to heat.

The effect of output loss is particularly great, and it is therefore desirable to improve transfer efficiency $\eta_G$ and transfer efficiency $\eta_R$, in electric power steering systems that convert motor assist force from a high output motor to rack thrust by way of a reduction mechanism and rack and pinion mechanism.

SUMMARY OF THE INVENTION

It is therefore a first object of the present invention is to provide a compact, low cost electric power steering apparatus having a rack and pinion mechanism with durability sufficient to withstand the torque load of motor inertia.

A second object of the present invention is to provide particularly technology for improving the transfer efficiency of the rack and pinion mechanism.

A third object of the present invention is to provide an electric power steering apparatus having a rack and pinion mechanism with sufficient strength relative to motor inertia by maintaining good mesh between the pinion and rack.

To achieve the above objects, an electric power steering apparatus according to the present invention has a motor for producing an assist torque in correspondence with a steering torque, a rack and pinion mechanism for a steering system, and a geared reduction mechanism for transferring the assist torque to the rack and pinion mechanism. The pinion and rack of the rack and pinion mechanism are both helical gears. The helix angle of the pinion is less than the helical gear friction angle. One of the helical gears has a tooth profile wherein at least the addendum is a circular arc substantially centered on the reference pitch line. The other of the helical gears has a tooth profile wherein at least the dedendum is a circular arc practically centered on the reference pitch line.

By using helical gears, the rack and pinion mechanism can transfer higher torque than a conventional spur gear.

When the steered wheels turn right or left to the maximum steering angle and the rack shaft meets the rack end stopper, that is, when the rack shaft moves to the end of its range of movement, the rack drops immediately. Because the torque at this time is impact torque and not static torque, torque is significantly higher than during normal driving conditions. However, because the helix angle of the helical gear pinion is less than the helical gear friction angle, thrust does not act on the pinion. Thrust acting on the pinion is only an extremely weak force occurring during normal conditions when the rack is not stopped at the right or left end of its range. Thrust acting on the input shaft is therefore low, and thrust acting on the bearings supporting the input shaft and the geared reduction mechanism linked to the input shaft is low. It is therefore not necessary to increase the strength of the input shaft, bearings, and geared reduction mechanism even though helical gears are used. These components can therefore be downsized and less expensive.

The tooth profile of the pinion and rack of the rack and pinion mechanism of the present invention is a curved arc.

Because a conventional involute tooth profile is convex, meshing in a gear pair is contact between two convex surfaces. With the curved arc tooth profile of the present invention, however, meshing in a gear pair occurs as contact between a convex surface and a concave surface. The contact area is thus increased, and contact pressure is reduced to approximately 1/6 that of an involute tooth profile.

By thus using a curved arc tooth profile in the rack and pinion of the rack and pinion mechanism, surface fatigue strength, bending strength, and bending fatigue strength are greater than with an involute tooth profile. This means that the rack and pinion mechanism of our invention can transfer the combined torque achieved by adding the assist torque from the motor to the steering torque, even when this combined torque is greater than during normal conditions.

The present invention can thus provide a compact, low cost electric power steering apparatus having a rack and pinion mechanism with durability sufficient to withstand torque loads resulting from motor inertia.

It is further preferable to insert a torque limiter between the motor and the geared reduction mechanism to limit the transfer of assist torque exceeding a specific limit from the motor to the reduction mechanism. When the rack shaft hits the rack end stopper, excessive torque will not be produced as a reaction to the motor, and excessive torque will not be transferred to the load side.

It is yet further preferable to provide a steering torque sensor for detecting steering torque. Yet further preferably the steering torque sensor is a magnetostrictive sensor for detecting magnetostriction of the pinion shaft of the rack and pinion mechanism. By using such a steering torque sensor, it is not necessary to divide the input shaft into two parts lengthwise and connect these two parts using a torsion bar as it is when steering torque is detected using the method of a conventional electric power steering apparatus. It is therefore also possible to lengthen the input shaft. Machining precision is increased by lengthening the pinion shaft, and the pinion and rack thus mesh more precisely. There is a particularly strong correlation between meshing precision and power transfer efficiency in a rack and pinion mechanism having a curved arc tooth profile, and improving meshing precision is therefore important.

The geared reduction mechanism of the present invention is preferably a combination of driver and driven gears in which the tooth surfaces of the driver gear and/or the tooth surfaces of the driven gear are coated with a low friction material coatings and the driver gear and driven gear mesh with no backlash. Coating with a low friction coefficient material can be achieved by imparting a coating made from a low friction coefficient material, or by impregnating the tooth surfaces with a low friction coefficient material.

By thus meshing driver gear and driven gear with no backlash, there is no play between the driver and driven gears, and impact torque due to motor inertia does not pass from the driver gear tooth surface to the driven gear tooth surface.

Moreover, the tooth surfaces of one or both of the driver gear and driven gear are coated with a low friction coefficient material coating. By lowering the coefficient of friction between the tooth surfaces of the driver and driven gears by means of this coating, power transfer efficiency can be increased even though there is no play between the driver and driven gears.

The pinion and/or rack of the rack and pinion mechanism in the present invention is yet further preferably a forging or other plastically processed part. There are, therefore no process marks left on the tooth surface as there are when the tooth surfaces are conventionally machined, and the surface roughness of the gear teeth is smooth. Friction force from sliding fear tooth surfaces is thus reduced, and the power transfer efficiency of the rack and pinion mechanism is increased.

Furthermore, because the pinion and rack are plastically processed parts, there is no residual stress produced in the tooth surfaces as there is with machining processes, and there is thus less deformation during hardening. A good tooth surface with low strain can therefore be achieved without correcting the tooth profile after hardening. In other words, because these parts are plastically processed, the surface roughness condition of the teeth is good with little strain from hardening or tool marks left. In addition, strength is increased because a fiber structure flowing continuously along the tooth profile is achieved through plastic processing, and bending strength and wear resistance are greater compared with machined gears in which the fiber structure is interrupted (not shown).

By processing the teeth of the rack and pinion to a curved arc tooth profile, and achieving this curved arc tooth profile in the rack and pinion by means of forging or other plastic processing technique, contact pressure is reduced, a good surface roughness condition is achieved, and interruption of the oil membrane formed by the lubricating fluid can be prevented. An electric power steering apparatus with little motor output loss can thus be provided because contact resistance between tooth surfaces can be significantly reduced and the power transfer efficiency of the rack and pinion mechanism improved.

Furthermore, by using forgings or otherwise plastically processed components for the curved arc tooth profile pinion and rack, it is possible to provide an electric power steering apparatus featuring improved mechanical properties in the materials, less tooth base stress, reduced wear, and outstanding strength and durability.

Yet further preferably, the rack shaft to which the rack is formed is comprised so that the back on the side opposite that to which the rack is formed is pushed toward the pinion by an adjustment bolt by way of intervening rack guide member and compression spring, particularly so that the adjustment bolt pushes directly against the back of the rack guide member when the pinion and rack mesh.

Good meshing between the pinion and rack can be maintained as a result of the rack guide member constantly pushing the rack shaft to the pinion, and the power transfer efficiency of the rack and pinion mechanism can thus be stabilized. Assist torque from the motor can be particularly transferred efficiently from the pinion to the rack shaft even during high load conditions such as turning the wheels when the vehicle is stopped. Therefore. compared with using a conventional involute tooth profile, less assist torque is needed, and a low power consumption electric power steering apparatus can be provided.

Moreover, tooth surface wear is reduced because the curved arc tooth profile is formed by forging or other plastic processing method. It is therefore possible to provide an electric power steering apparatus having a rack and pinion mechanism with little play even without applying pressure using an adjustment spring.

Furthermore, because the tooth profile of the rack and pinion is a curved arc as described above, the contact area of meshed teeth is greater than that with an involute tooth profile. Because the contact pressure drops, tooth surface sliding is also smoother. A good steering feel can also be maintained in the steering wheel even though an adjustment bolt directly supports the rack shaft so that the rack shaft will not move back in reaction to the strong force produced perpendicular to the longitudinal axis when high torque due to motor inertia acts on the rack and pinion mechanism.

The tooth width of the rack formed on the rack shaft in the present invention is greater than the diameter of the rack shaft in the part where the rack is not formed.

The rack shaft can be made from round rod or pipe stock.

The rack shaft on which the rack is formed is housed unrockably and slidably in the longitudinal direction in a housing. A rocking force is produced on the rack shaft when the pinion and rack are helical gears, but this rocking action of the rack shaft is restricted in the present invention. Good meshing between the pinion and rack can thus be maintained.

More specifically, the back of the rack shaft opposite the surface on which the rack is formed is convex, and a rack guide is disposed having a concave end for contacting convex back at contact points, and pushing the convex back of the rack shaft toward the rack. These contact points are set in relation to the rack shaft supported by the housing so the concave end limits rocking of the convex part of the rack shaft when a rocking force acts on the rack shaft. The rack shaft is thereby housed so that it cannot rock in the housing.

The rack guide preferably pushes the guide member having the concave end to the rack shaft side by means of adjustment bolt and intervening compression spring. The adjustment bolt pushes directly on the back of the surface to which the concave end is formed to the guide member when the pinion and rack mesh.

When torque is transferred from the pinion to the rack during steering, forces act on the rack shaft in the direction of the longitudinal axis and in the direction perpendicular thereto. Because the adjustment bolt pushes directly against the back of the guide member, the rack cannot move back as a result of force in the longitudinal axis direction. Good meshing between the pinion and rack can thus be always maintained. Moreover, the contact area is great and contact pressure between meshing surfaces is reduced as a result of the curved arc tooth profile, and sliding between the tooth surfaces is therefore smoother.

Yet further preferably, a supported part whereby the rack shaft is supported on a housing by way of intervening bearings, and a rack formation part to which the rack is formed, are disposed to the rack shaft. The section perpendicular to the axis of the rack formation part is a circular section equal in diameter to the supported part, and the distance from the center of this circular section to the reference patch line is set to a specific dimension. The actual tooth width of the rack is greater than the rack tooth width determined by this specific dimension.

By thus making the tooth width of the rack actually greater than the tooth width of a conventional rack, the mechanical strength (bending strength and bearing strength) of the rack is improved, and a rack and pinion mechanism with strength sufficient to withstand the torque load from motor inertia can be achieved. The part of the rack shaft where the rack is not formed only needs rigidity comparable to a conventional rack shaft because it simply slides to push the wheels for steering. The weight of the rack shaft can also be limited because it is only necessary to increase the tooth width of the rack.

It is further preferable to make the tooth width of the rack formed on the rack shaft greater than the diameter of the rack shaft in that part where the rack is not formed.

BRIEF DESCRIPTION OF THE DRAWINGS

Certain preferred embodiments of the present invention will hereinafter be described in detail, by way of example only with reference to the accompanying drawings in which:

FIG. 7A to FIG. 7D show a rack and pinion mechanism of which the pinion and rack are helical gears;

FIG. 8A to FIG. 8C show an operation of the helical gear pinion and rack;

FIG. 14 is a perspective view of the rack shaft in the second embodiment;

FIG. 15 is an enlarged sectional view taken along line 15—15 of FIG. 14,

FIG. 18 is a sectional view showing a variation of the rack shaft in the second embodiment made from pipe stock;

FIG. 19 is an enlarged sectional view taken along line 19—19 of FIG. 18;

FIG. 20 shows the manufacturing steps for the rack shaft variation shown in FIGS. 18 and 19, FIG. 20A is a sectional view taken along line a-a of FIG. 20 and FIG. 20B is a sectional view taken along line b-b of FIG. 20.

FIG. 21 is a schematic diagram of an electric power steering apparatus according to a fourth preferred embodiment of the present invention;

FIG. 22 is an enlarged sectional view taken along line 22—22 of FIG. 21;

FIG. 36 is a perspective view of a rack shaft in a variation of the fourth embodiment in which the diameter of the part of the rack shaft where the rack is formed is greater than the diameter of the part where the rack is not formed; and FIG. 37 is an enlarged sectional view taken along line 37—37 of FIG. 36.

DETAILED DESCRIPTION OF THE PREFERRED EMBODIMENTS

The following description is merely exemplary in nature and is in no way intended to limit the invention, its application or uses.

First Embodiment

Figure 1:
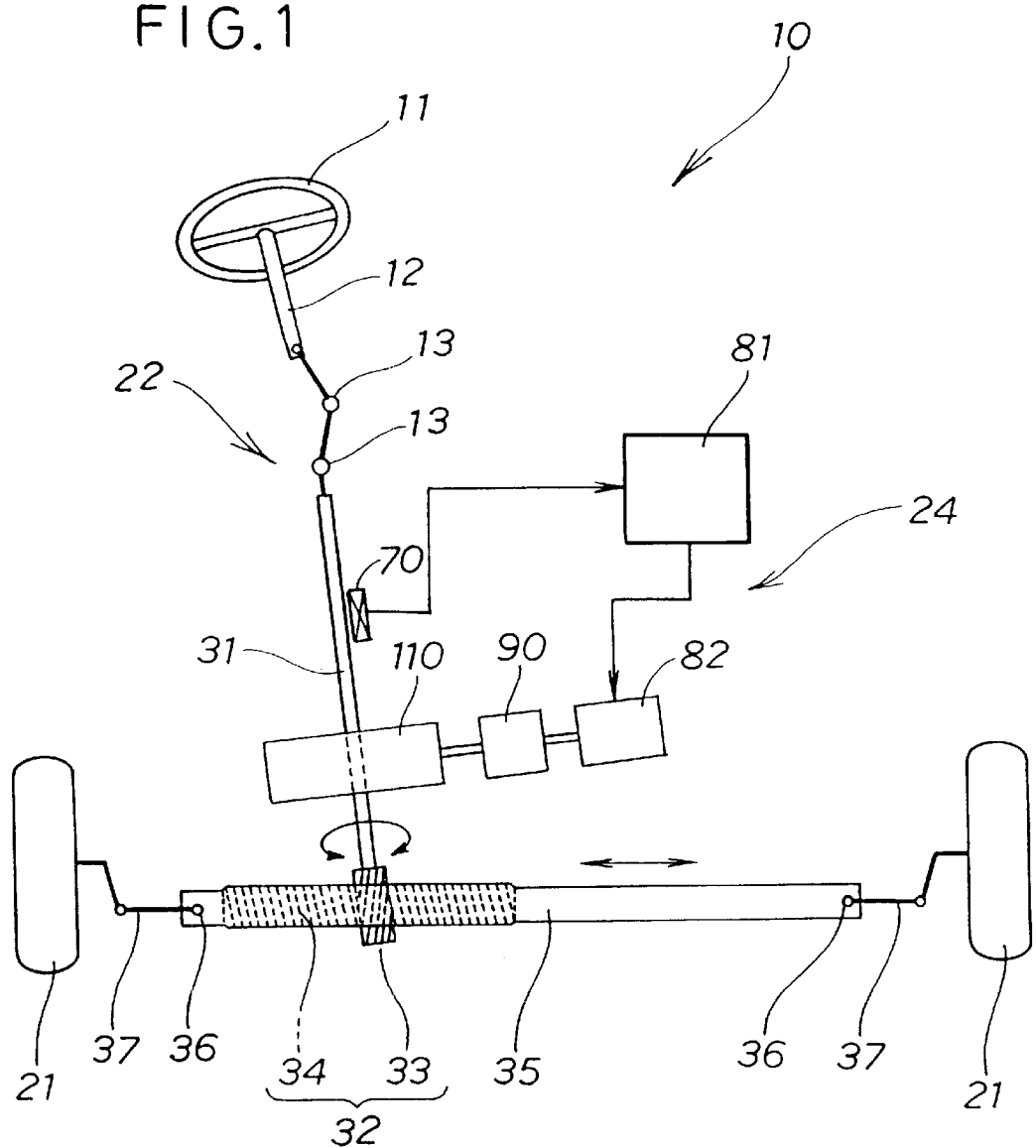
FIG. 1 is a schematic diagram of a vehicle steering system according to the present invention.

FIG. 1 shows an electric power steering apparatus 10 according to the present invention, which comprises a motor 82 producing assist torque for the steering system 22 from the steering wheel 11 to the steered wheels 21.

The steering wheel 11 of this electric power steering apparatus 10 is linked by way of intervening steering shaft 12 and universal joints 13 to input shaft 31. A rack and pinion mechanism 32 is connected to input shaft 31, and right and left steered wheels 21 are mounted by way of right and left tie rods 37 to the ends of rack and pinion mechanism 32.

The rack and pinion mechanism 32 comprises pinion 33 disposed to input shaft 31 and rack shaft 35 having a rack 34 meshing with pinion 33.

The electric power steering apparatus 10 also has a steering torque sensor 70.

With an electric power steering apparatus 10 thus arranged, steering torque producing by the driver turning the steering wheel 11 is transferred through,input shaft 31, rack and pinion mechanism 32, and right and left tie rods 37 to steer the right and left steered wheels 21.

More specifically, the steering torque applied to the steering system 22 by the steering wheel 11 is detected by steering torque sensor 70 and outputs a detection signal to a controller 81. Based on this detection signal the controller 81 generates a control signal causing the motor 82 to produce assist torque in correspondence with the steering torque. The assist torque is transferred through torque limiter 90, a geared reduction mechanism 110, and input shaft 31 to rack and pinion mechanism 32 of the steering system 22 to assist steering the right and left steered wheels 21 by means of the rack and pinion mechanism 32 and right and left tie rods 37. The steered wheels 21 are thus steered using the combined torque of the assist torque from motor 82 and the steering torque produced by the driver turning the steering wheel 11.

Figure 2A:
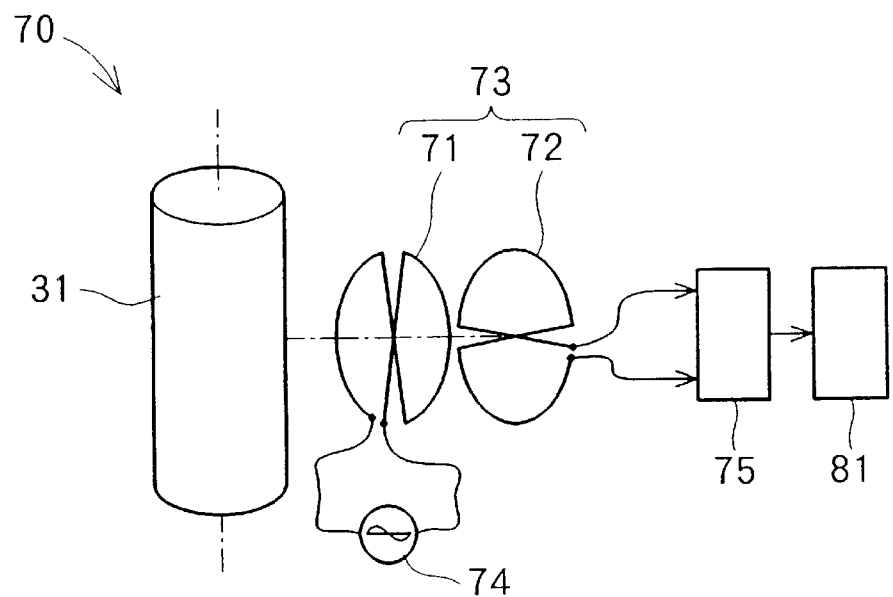
FIG. 2A and FIG. 2B describe the principle whereby a magnetostrictive torque sensor used as the steering torque sensor in FIG. 1 operates.
Figure 2B:
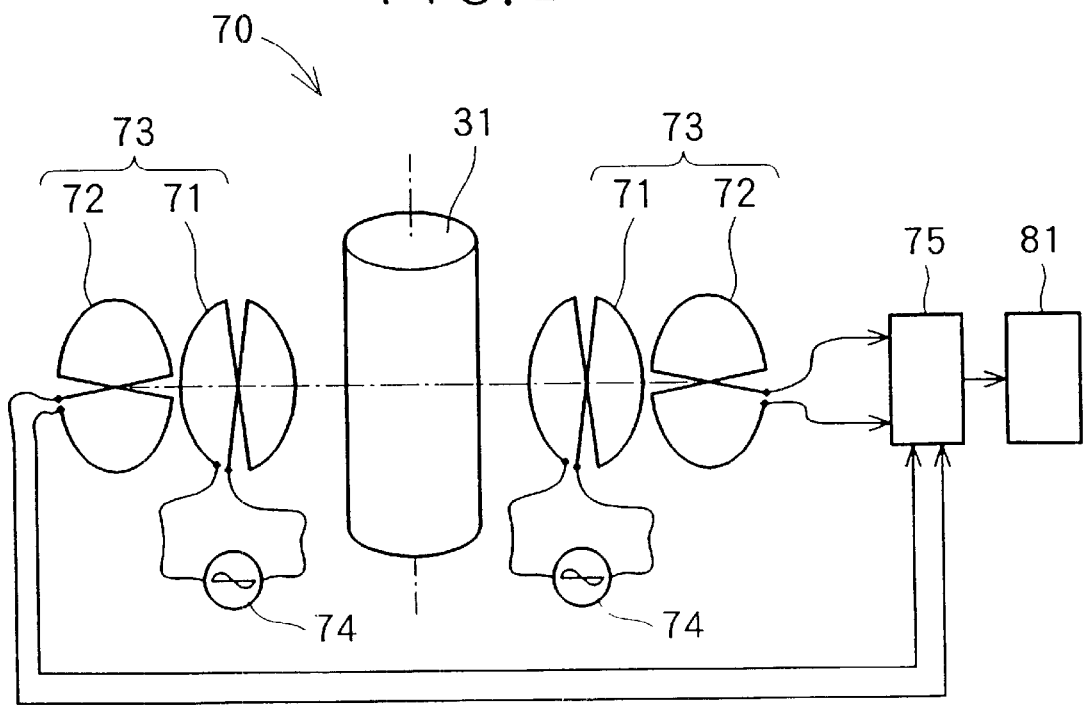

FIGS. 2A and 2B show the principle of the steering torque sensor 70 used in an electric power steering apparatus according to the present invention.

The steering torque sensor 70 used in this preferred embodiment is a magnetostrictive type torque sensor that uses an electric coil to electrically detect the magnetostriction produced according to the torque acting on the input shaft 31, which has a magnetostriction characteristic similar to a steel bar. A magnetostriction type torque sensor of this type is taught, for example, in Japanese Patent Laid-Open Publication (kokai) No. HEM-6-221940. The steering torque sensor 70 is further described below.

The steering torque sensor 70 shown in FIG. 2A has an excitation coil 71 and detection coil 72, each substantially the same size and shaped in a basic figure-8, stacked substantially coaxially and orthogonally to each other to form magnetic head 73 disposed proximally to the outside circumference of input shaft 31. In other words, the figure-8 shaped excitation coil 71 is disposed with respect to the outside circumference of the input shaft 31, and the figure-8 shaped detection coil 72 is stacked to the excitation coil 71 with its phase shifted 90 degrees to the excitation coil 71. The straight line part of the FIG. 8 configuration of the excitation coil 71 is substantially parallel to the outside of the input shaft 31 or substantially parallel to the axial direction of the input shaft 31. Also shown in FIG. 2A are excitation voltage source 74 and output voltage amplifier 75.

When a high frequency ac voltage (excitation voltage) in the range 20 kHz to 100 kHz is supplied from excitation voltage source 74 to excitation coil 71, an ac voltage of the same frequency as the excitation voltage is obtained from the detection coil 72 corresponding to the magnetostriction of input shaft 31 in response to the steering torque. Depending upon the direction of the torque acting on input shaft 31, the phase of this output voltage is either same or opposite phase to the excitation voltage. The amplitude of the output voltage is proportional to the magnitude of the torque. It is therefore possible to detect the size and direction of the torque by synchronous commutation of the output voltage referenced to the phase of the excitation voltage.

The output voltage is then amplified by output voltage amplifier 75 and supplied to controller 81 as the detection signal from steering torque sensor 70.

It should be noted that the above described configuration can be adapted to the magnetization force of input shaft 31 by simply increasing or decreasing the number of winds in excitation coil 71 and detection coil 72, assuring that the winds in the excitation and detection coils 71, 72 are mutually alternating.

The steering torque sensor 70 shown in FIG. 2B has two magnetic heads 73, each comprising a excitation coil 71 and detection coil 72. These two magnetic heads 73 are symmetrically disposed proximally to the outside circumference of input shaft 31 and to the axis of input shaft 31. In this case the output voltage amplifier 75 amplifies the difference between the detection signals from detection coils 72 to obtain a steering torque signal that is significantly unaffected by changes in environmental temperature.

By using a steering torque sensor 70 as shown in FIG. 2A or FIG. 2B in an electric power steering apparatus according to the present invention, it is not necessary to divide the input shaft 31 into two parts lengthwise and connect these two parts using a torsion bar as it is when steering torque is detected using the method of a conventional electric power steering apparatus.

In addition to simplifying the input shaft 31, it is therefore also possible to increase the length of the input shaft 31. Moreover, it is easier to set the input shaft 31 in the processing machine when processing the pinion 33 disposed to the input shaft 31 as shown in FIG. 1. Machining precision is therefore higher and the pinion 33 and rack 34 can thus be made to mesh more precisely. The power transfer efficiency of the rack and pinion mechanism 32 is thereby improved.

Figure 3:
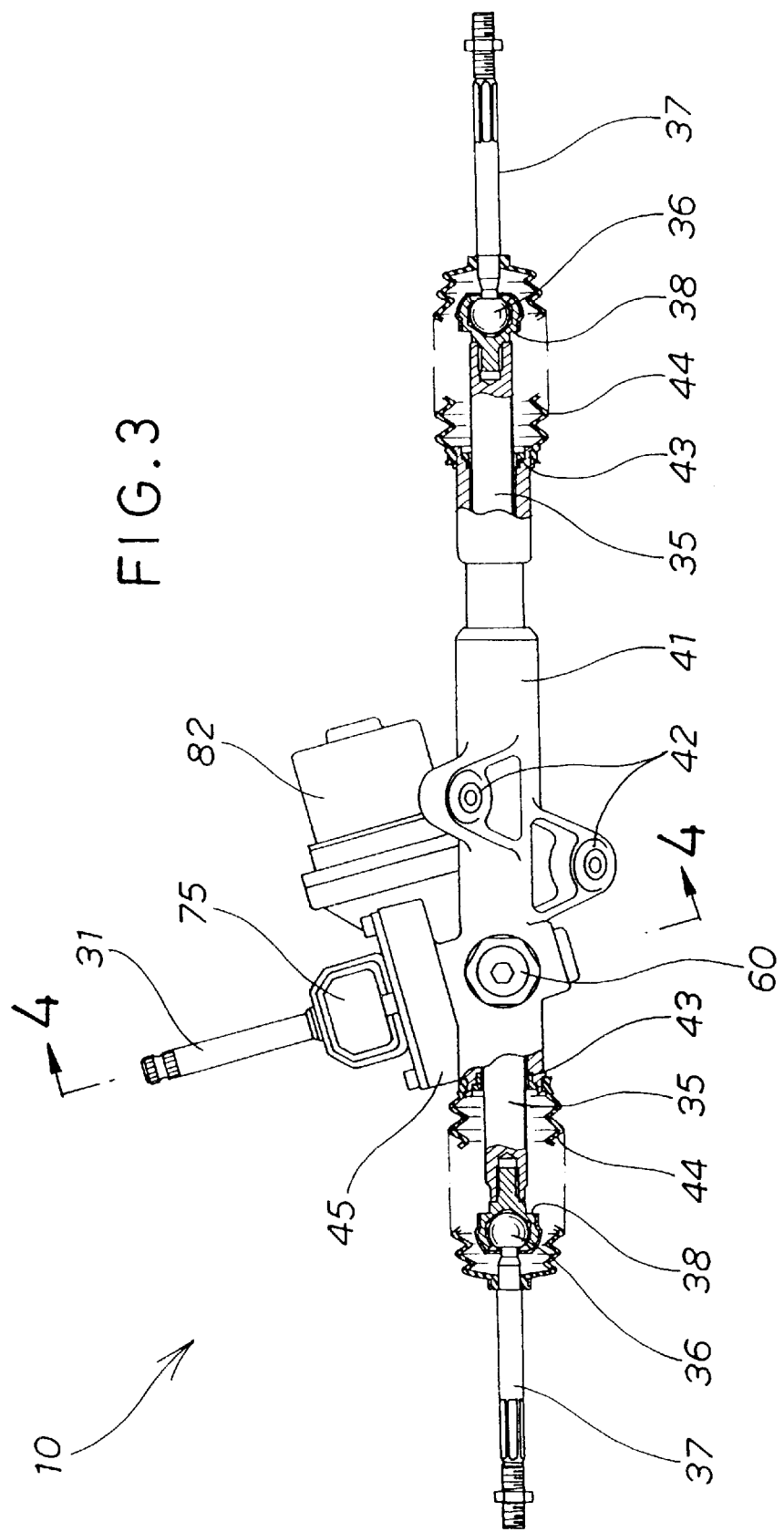
FIG. 3 is an overview of the electric power steering apparatus of FIG. 1.

FIG. 3 is an overview of the complete electric power steering apparatus according to this first embodiment of the invention. Note that the rack shaft 35 of this electric power steering apparatus 10 is housed in housing 41 so that it can slide along the axial direction of the rack shaft 35.

The rack shaft 35 has a ball joint 36 threaded onto each end thereof projecting in the axial direction front housing 41. Right and left tie rods 37 are connected to these ball joints 36. The housing 41 has brackets 42 for mounting the electric power steering apparatus 10 to the chassis (not shown in the figure), and a stopper 43 on each end in the axial direction.

When rack shaft 35 slides a specific distance to the right, the rack end 38 that is the contact surface of the left ball joint 36 contacts stopper 43. When rack shaft 35 slides a specific distance to the left, the rack end 38 that is the contact surface of the right ball joint 36 contacts stopper 43. By thus limiting movement of rack shaft 35, stoppers 43 limit the maximum steering angle of the right and left steered wheels 21 (see FIG. 1). When rack shaft 35 moves to the end of its movement range, the right and left steered wheels 21 are turned to the maximum steering angle. Note that boots 44 shown in FIG. 3 provide a dust seal.

Figure 4:
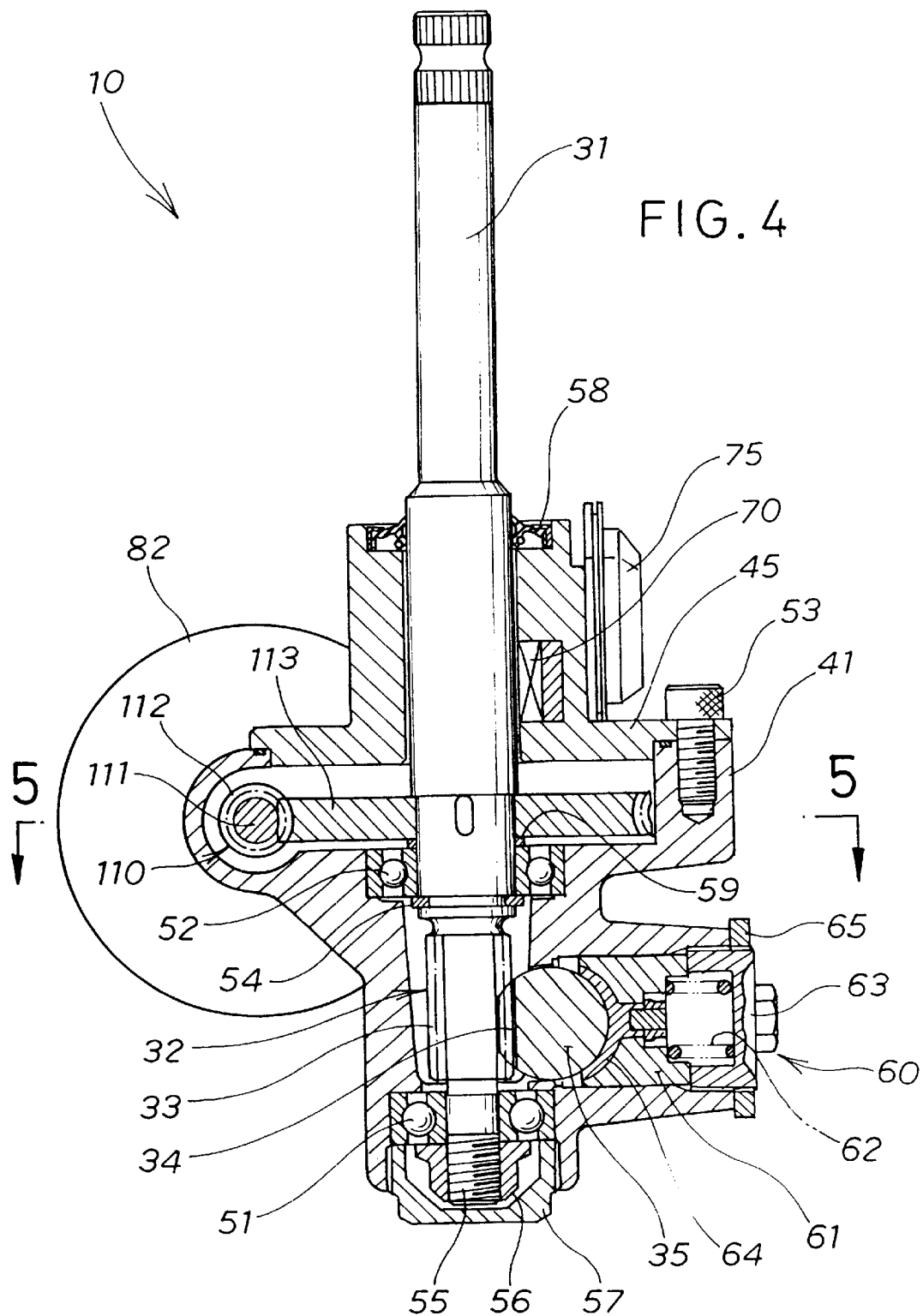
FIG. 4 is an enlarged sectional view taken along line 4—4 of FIG. 3.

As shown in FIG. 4, electric power steering apparatus 10 has input shaft 31, rack and pinion mechanism 32, steering torque sensor 70, torque limiter 90 (see FIG. 1), and reduction mechanism 110 housed in housing 41. The top opening to housing 41 is closed by a lid 45. The steering torque sensor 70 is mounted to the lid 45 in this exemplary embodiment, but can be alternatively fixed to the housing 41.

The housing 41 rotatably supports the bottom end and longitudinal middle part of input shaft 31 by means of two bearings 51 and 52. The housing 41 further has a rack guide 60. Also shown are lid mounting bolt 53 and lock ring 54.

Threads 55 are formed on the bottom end of input shaft 31 with pinion 33 integrally disposed to input shaft 31 just above threads 55. The top end of input shaft 31 protrudes from the top of lid 45. This input shaft 31 thus functions as a pinion shaft. Movement in the longitudinal direction of input shaft 31 is limited by threading a nut 56 onto threads 55. Also shown are cap nut 57, oil seal 58, and spacer 59.

The rack guide 60 comprises a guide member 61 contacting rack shaft 35 from the side opposite rack 34, and adjustment bolt 63 for urging guide member 61 by way of compression spring 62. By appropriately setting adjustment bolt 63 in housing 41 with this rack guide 60, compression spring 62 pushes guide member 61 with appropriate force against rack 34, and thereby pushes rack 34 against pinion 33. Note that contact 64 pushed against and enabling rack shaft 35 to turn smoothly, and lock nut 65, are also shown in FIG. 4.

Figure 5:
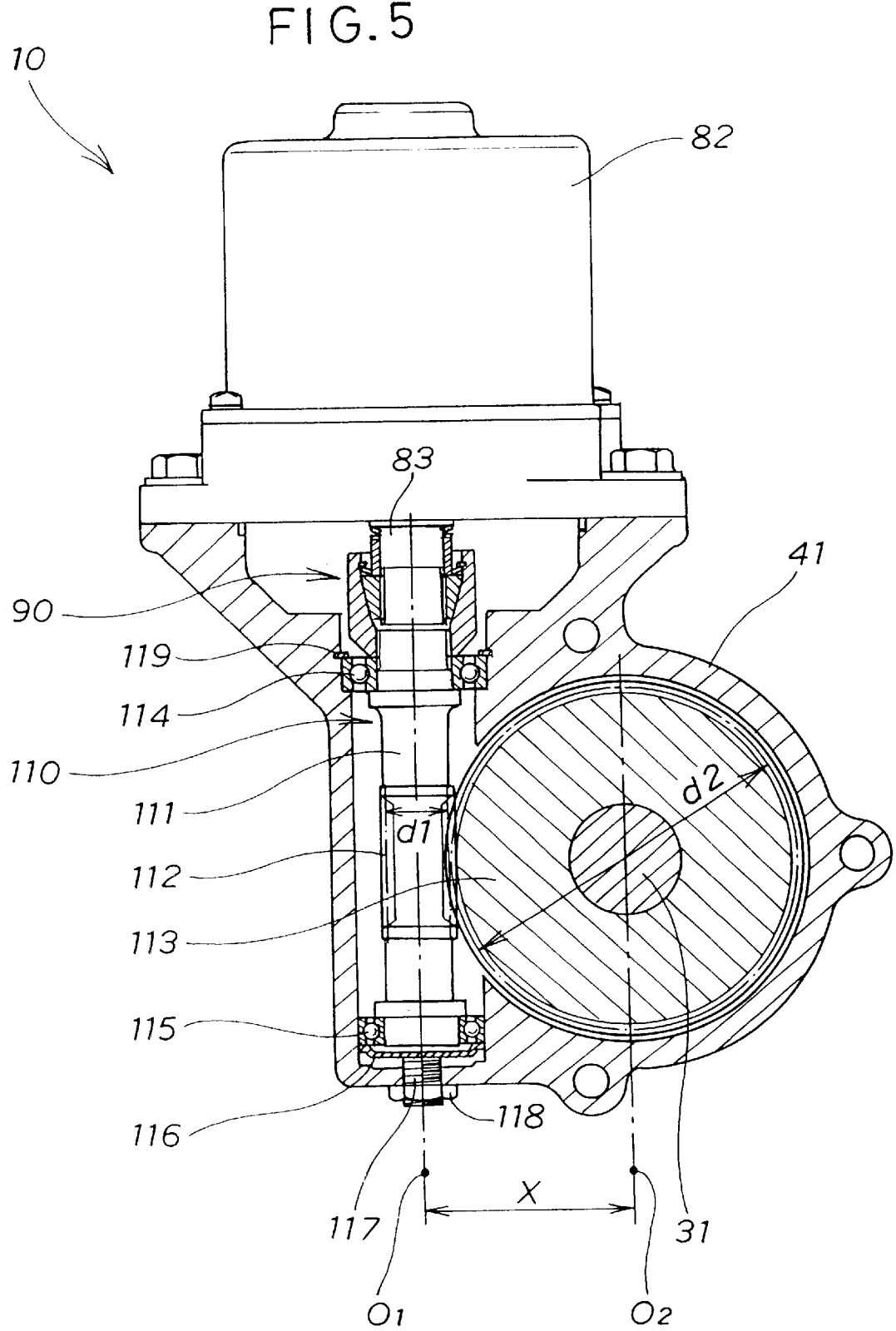
FIG. 5 is an enlarged sectional view taken along line 5—5 of FIG. 4.

FIG. 5 shows the relative positions of the input shaft 31, motor 82, torque limiter 90, and reduction mechanism 110.

The motor 82 is mounted to housing 41. The output shaft 83 of the motor 82 extends into housing 41.

The reduction mechanism 110 is a torque transfer means for transferring assist torque produced by motor 82 to input shaft 31. It is a worm gear mechanism comprising a combination of driver and driven gears. The reduction mechanism 110 comprises a transfer shaft 111 connected by way of intervening torque limiter 90 to output shaft 83 of motor 82; worm (driver gear) 112 formed on transfer shaft 111; and worm wheel (driven gear) 113 connected to input shaft 31 and engaging worm 112. The assist torque from motor 82 is transferred by way of input shaft 31 to rack and pinion mechanism 32 (see FIG. 1).

A feature of our invention is that a coating layer of a low friction material is imparted by a surface processing technique to the tooth faces of worm 112 and/or the tooth faces of worm wheel 113. A coating layer of a low friction material can be imparted by, for example, coating the tooth faces with the low friction material or by impregnating the surfaces with a low friction material. Power transfer efficiency is improved by lowering to a specific value the friction coefficient of the sliding surfaces between the tooth faces of worm 112 and the tooth faces of worm wheel 113.

Exemplary low friction materials include polytetrafluoroethylene (PTFE), which is sold under the name Teflon®. Fluoropolymers typically have a very low coefficient of friction, and are therefore well suited as low friction materials.

Surface processing techniques for imparting a low coefficient of friction coating using these low friction materials include the first and second surface processing methods further described below.

In the first surface processing method the worm 112 and worm wheel 113 are made from carbon steel for machine structures, including JIS-G-4051 carbon steel. Electroless nickel and PTFE are deposited to the tooth surfaces of worm 112 and worm wheel 113 in a specific processing solution so that there is a uniform distribution of 10% to 30% PTFE by volume in the coating. The electroless nickel and PTFE coating is then strongly bonded to the surfaces of the teeth using a heat process (sintering at approximately 400° C.). Coating thickness is 5 $\mu$m to 20 $\mu$m NIFGRIP® from Ulvac Techno, Ltd., is one example of a product manufactured using this first surface processing method.

In the second surface processing method the worm 112 and worm wheel 113 are also made from carbon steel for machine structures, including JIS-G-4051 carbon steel. A porous film of nickel End phosphorus is then formed on the tooth surfaces of worm 112 and worm wheel 113 using an electroless coating method. This porous film is then impregnated with PTFE and heat processed (sintering at approximately 400° C.) to strongly bond the coating to the teeth surfaces. The coating bonded to the tooth surface is a porous film of granularly precipitated nickel and phosphorus impregnated with PTFE, and has a thickness of 5 $\mu$m to 20 $\mu$m. NEDOX™ from Ulvac Techno, Ltd., is one example of a product manufactured using this second surface processing method.

The transfer shaft 111 is disposed coaxially to output shaft 83, and is rotatably supported on housing 41 by way of two intervening bearings 114, 115. The first bearing 114 positioned near the output shaft 83 is mounted immovably with respect to the axial direction of transfer shaft 111 on housing 41. The second bearing 115 positioned far from output shaft 83 is also mounted immovably with respect to the axial direction of transfer shaft 111 on housing 41.

The second bearing 115 is urged to output shaft 83 by adjustment bolt 117 by way of intervening light leaf spring 116. By thus adjusting the position of second bearing 115 by means of adjustment bolt 117, transfer shaft 111 can be adjusted to remove any play in the axial direction thereof.

By further adjusting the axial displacement of worm 112, the worm 112 and worm wheel 113 can be adjusted to remove any play while maintaining suitable friction when worm 112 and worm wheel 113 mesh.

Thermal expansion in the axial direction of transfer shaft 111 can also be absorbed by the resilience of leaf spring 116.

Note that lock nut 118 and lock ring 119 are also shown in FIG. 5.

The present invention is characterized by causing the teeth of worm 112 and the teeth of worm wheel 113 to mesh with no backlash. The means whereby backlash is eliminated is achieved, for example, by some combination of the following four factors.

(1) Manufacturing worm 112 from metal and coating the tooth surfaces thereof with a low friction coefficient material.

(2) Using a resin or plastic worm wheel 113.

(3) Setting the distance X from center $O_1$ of worm 112 to center $O_2$ of worm wheel 113 to a specific theoretical value (reference value).

(4) Setting the reference pitch circle diameter $d_1$ of worm 112 or the reference pitch circle diameter $d_2$ of worm wheel 113 slightly greater than a specific theoretical value (reference value).

When reduction mechanism 110 is assembled, the teeth faces of worm 112 and worm wheel 113 mesh with pressure corresponding to the difference between reference pitch circle diameter $d_1$ and $d_2$ applied therebetween. This eliminates backlash (mesh gap) between the teeth of worm 112 and worm wheel 113, and thus eliminates play. Because there is no play, torque shock from the inertia of motor 82 is not transferred from the teeth faces of worm 112 to the teeth faces of worm wheel 113. The durability of reduction mechanism 110 is thus further improved.

However, when backlash disappears, meshing resistance (friction) between the teeth faces of worm 112 and worm wheel 113 normally increases. This problem is resolved by coating the teeth faces of worm 112 with a coating made from a low friction coefficient material. This low friction coefficient material reduces the friction coefficient of the sliding faces of the teeth of worm 112 and worm wheel 113. It is therefore possible to increase power transfer efficiency while maintaining appropriate friction between the meshing teeth surfaces of gears 112 and 113 even though meshing of worm 112 and worm wheel 113 is adjusted to eliminate any play.

Figure 6:
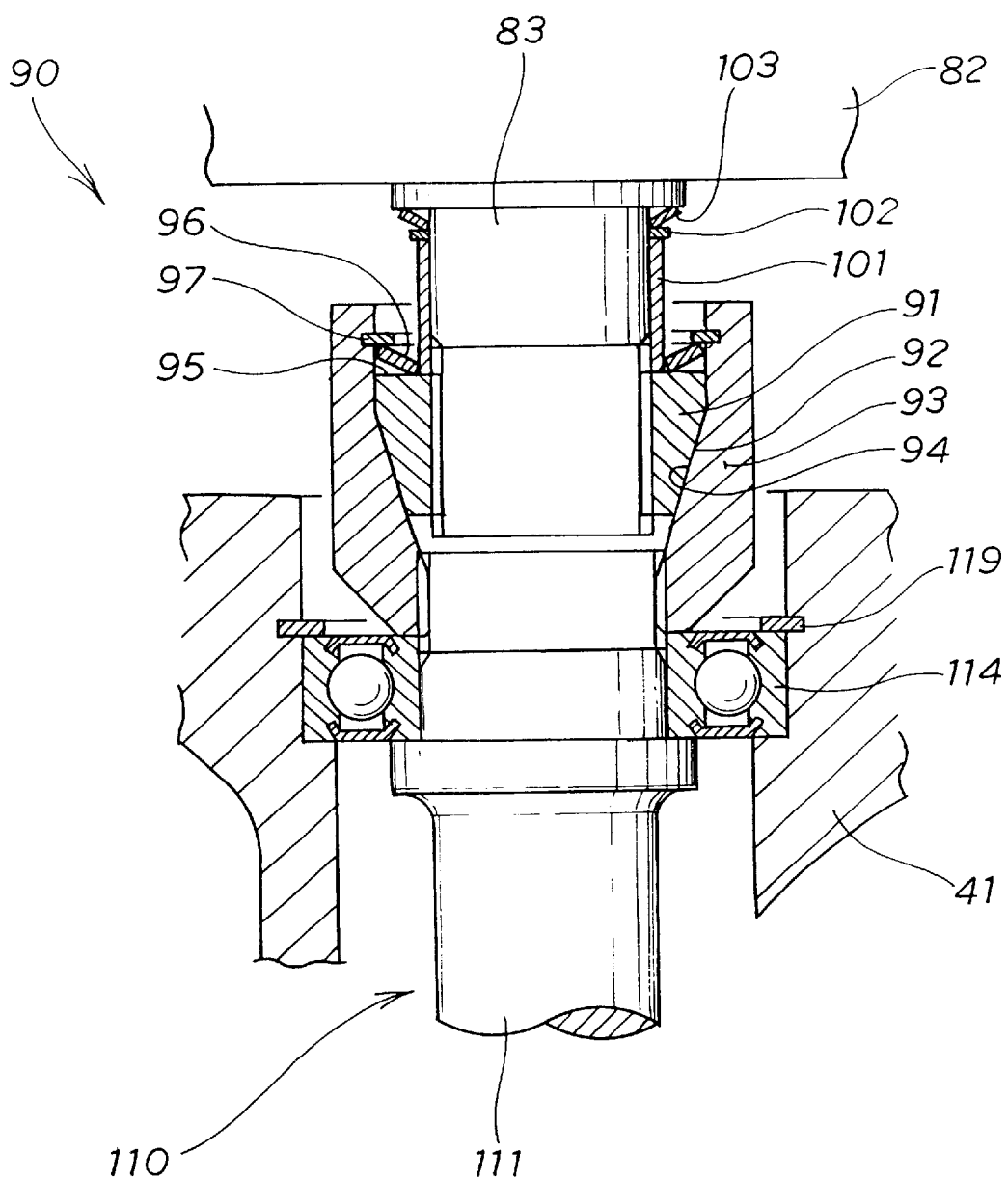
FIG. 6 is an enlarged sectional view of the torque limited shown in FIG. 5.

FIG. 6 shows torque limiter 90. A further feature of the present invention is the intercession of torque limiter 99 between motor 82 and reduction mechanism 110. This torque limiter 90 comprises a torque limiting mechanism having an inner member 91 serration connected to output shaft 83 of motor 82 fit in a cylindrical outer member 93, which is serration connected to transfer shaft 111.

The inner member 91 is a male member of which the outside surface 92 is tapered toward the end of transfer shaft 111. The outer member 93 is a female member of which the inside surface 94 is tapered to match and fit outside surface 92 of inner member 91. The torque limiter 90 is assembled by fitting tapered outside surface 92 in tapered inside surface 94, urging the back end 95 of inner member 91 with a belleville spring 96, and locking it in place with lock ring 97. Note that spacer 101, washer 102, and Belleville spring 103 are also shown.

Outside surface 92 and inside surface 94 are engaged with a specific friction force therebetween as a result of the resilience of belleville spring 96 pushing inner member 91 so that the outside surface 92 of inner member 91 is pushed against the inside surface 94 of outer member 93. Because the torque limiter 90 is thus comprised, outside surface 92 and inside surface 94 will slip against each other if torque exceeding the specific friction force acts on output shaft 83. It is therefore possible to limit the assist torque transferred from motor 82 to reduction mechanism 110. In other words, it is possible to eliminate over-torquing. Excessive torque therefore does not occur at the motor 82, and excessive torque is not transferred to the load side.

Furthermore, because the inner member 91 and outer member 93 are taper fit, assembly precision is extremely high and center alignment is easy.

Furthermore, because a small torque limiter 99 intercedes between reduction mechanism 110 and the relatively high speed motor 82, enclosure inside the housing 41 is simple.

FIGS. 7A to 7D show a rack and pinion mechanism according to this first preferred embodiment of the present invention. Line L1 is the center axis of the pinion; line L2 is the center axis of the rack shaft; and line L3 is a line perpendicular to the tooth surface of the rack. It will be noted that in this exemplary embodiment center axis L1 of pinion 33 is assumed to be orthogonal to the center axis L2 of the rack shaft 35.

The pinion 33 and rack 34 of the rack and pinion mechanism 32 shown in FIG. 7A are helical gears. As shown in FIG. 7B, helical gears are cylindrical gears in which the tooth trace 33c, which is the line of intersection between the tooth surface 33b and the circumferential surface of cylinder 33a (the reference pitch surface) is a helix 33d with a specific helix angle θ. Note that helix angle θ is the angle between the helix 33d and the root diameter line 33e (a line orthogonal to the pitch diameter line) of cylinder 33a.

FIG. 7C is an enlarged perspective view of the helical gear forming rack 34. Note that the helix angle is the same as the helix angle θ of the helical gear forming the pinion 33.

A further feature of our invention is that the helix angle θ of the helical gears forming pinion 33 and rack 34 is set within a range not exceeding the friction angle of the helical gears. The reason for this is described further below.

FIG. 7D is an enlarged section view of the tooth profile of the helical gears forming pinion 33 and rack 34. Note that the tooth profile of these helical gears is a circular arc.

It will be noted that gears with a circular arc tooth profile are known in the literature, including "New gears and their applications: circular arc tooth profile gears" (Machine design, Vol. 26, No. 3, pp. 47 to 51, Nikkan Kogyo Shinbunsha, March 1982), Gears with a circular arc tooth profile are further described below.

That is, circular arc tooth profile gears are gears in which the addendum in one of a pair of gears is on an arc of which the center is substantially reference pitch line Pi, and the dedendum of the other gear in the pair is on an arc of which the center is substantially reference pitch line Pi. Gears with a circular arc tooth profile can have a symmetrical or asymmetrical tooth profile.

Note that the dedendum is the part of the tooth surface between reference pitch line Pi and the bottom land, and the addendum is the part of the tooth surface between the reference pitch line Pi and the crown.

Referring to pinion 33 in FIG. 7D, a symmetrical circular arc tooth profile gear means that the arc of the addendum 33g and the arc of the dedendum, or more specifically that the addendum 33g and dedendum 33f are point symmetrical to the reference pitch line Pi. Exemplary of such gears are the type 3 Novikov gear, and Sym MarC® gears from Hitachi Seisakusho. Note that in FIG. 7D r is the radius of the arcs.

The symmetrical circular arc tooth profile of the rack 34 is identical to that of the pinion 33. Addendum 34a and dedendum 34b are formed on arcs point symmetrical to reference pitch line Pi.

In an asymmetrical circular arc tooth profile gear pair the addendum and dedendum of the tooth profile are not symmetrical to the reference pitch line Pi. More specifically, only the arc of the addendum is centered on reference pitch line Pi in one gear, and only the arc of the dedendum is centered on reference pitch line Pi in the other gear of the pair. Exemplary of an asymmetrical circular arc tooth profile gear are the type 1 and type 2 Novikov gears, and Cir CarC® gears manufactured by Associated Electrical Industries of Britain.

The helical gears used in the present invention are preferably symmetrical circular arc tooth profile gears.

With the transverse tooth profile of an involute tooth form, meshing (contact) occurs between convex tooth surfaces. In the present invention, however, the tooth profile of the helical gear is a circular arc. With the transverse tooth profile of a circular arc tooth form, meshing (contact) occurs between convex and concave tooth surfaces. Because the radius of relative curvature in the tooth trace direction is large, the area of the line of contact is large when a load is applied. In general, compared with involute gears, the surface fatigue strength of circular arc gears is 6 to 7 times greater, bending strength is 1.5 to 1.6 times greater, and bending fatigue strength is 1.5 to 1.6 times greater.

Furthermore, because of the circular arc shape, dedendums 33f and 34b are rounded compared with the tooth profile of a conventional involute tooth gear. It is therefore possible to reduce the notch effect on impact and fatigue strength, and it is therefore possible to further improve the bending strength of the tooth part.

By using a circular arc helical gear for pinion 33 and rack 34 it is possible to further increase gear strength and achieve the following benefits.

For example, when the right and left steered wheels are turned to the maximum steering angle, that is, when rack shaft 35 in FIG. 3 has moved to the end of its range of movement, the left ball joint 36 contacts stopper 43, the right ball joint 36 contacts stopper 43, and movement of rack shaft 35 stops immediately. At this time torque significantly greater than that produced during normal steering acts on pinion 33 (see FIG. 1) and rack 34. The resultant stronger pinion 33 and rack 34 can, however, sufficiently withstand this high torque.

Furthermore, because pinion 33 and rack 34 have a circular arc tooth profile, meshing of the gear pair results in contact between concave and convex tooth surfaces, and the contact area when the gears mesh is thus greater than that achieved with a conventional involute tooth profile. Because the contact pressure is lower (contact pressure drops to approximately ⅙ that of an involute tooth profile), the tooth surfaces slide more smoothly. Moreover, circular arc tooth profile gears are also known to contact quite similarly to sliding bearings. An advantage of a sliding bearing is that contact is uniform. It is possible to apply this advantage directly to the contact of a circular arc tooth profile gear. Friction between sliding tooth faces can therefore be significantly reduced.

Referring to FIG. 4, when a high torque load due to motor 82 inertia acts on rack and pinion mechanism 32, a strong force in the direction perpendicular to the axis acts in conjunction therewith on the rack shaft 35. So that this force does not cause rack shaft 35 to move back, the friction force of the sliding tooth surfaces drops even though adjustment bolt 63 pushes directly against the back of guide member 61. It is therefore possible to increase the power transfer efficiency of the rack and pinion mechanism 32 while still maintaining a feeling of good steering control of steering wheel 11 (see FIG. 1).

Moreover, because the friction force of the sliding tooth surfaces is low, it is possible to transfer assist torque from motor 82 to rack shaft 35 by intervening pinion 33 with good efficiency even when steering under high load conditions (such as when turning the wheels while the vehicle is stopped). Less assist torque is therefore needed compared with conventional involute gears, and an electric power steering apparatus with low power consumption can therefore be provided.

FIG. 8A shows the rack 34 being moved to the left in the figure by turning pinion 33. When the right and left steered wheels are turned the maximum steering angle to the right, that is, when rack shaft 35 moves to the end of its range of movement, the right ball joint 36 contacts stopper 43 and rack 34 movement stops. The torque at this time is impact torque, and is thus the maximum torque, greater than torque during normal steering.

FIG. 8B illustrates the state when the tooth surface of rack 34 is pushed to the left in the figure by the tooth surface of pinion 33. FIG. 8C shows the tooth surface of rack 34 as a right triangle with slope D.

In FIG. 8B and FIG. 8C, the angle of inclination of slope D is θ, i.e., the same as the helix angle θ of the helical gears. The work force of tooth E of pinion 33 pushing against slope D is $W_0$, which is comparable to the force (torque of pinion 33) acting in the circumferential direction on the pitch circle of pinion 33. Force $W_0$ therefore works perpendicularly to line AB.

When rack 34 stopped at the end of its movement range is pushed further by pinion 33, tooth E tries to slip and move along slope D in the direction of point A. The direct pressure working between slope D and tooth E (the force working perpendicularly to the tooth surface), that is, direct pressure $W_1$ working between the tooth surface of pinion 33 and the tooth surface of rack 34, is obtained from equation (1).

$$W_1 = W_0 \times \cos\theta \quad (1)$$

The force working parallel to slope D (that is, force $W_2$ working parallel to the tooth surface of rack 34) is obtained from equation (2).

$$W_2 = W_0 \times \sin\theta \quad (2)$$

Force $P_0$ parallel to line AB is also needed so that tooth E does not slip and move towards point A as a result of force $W_2$. This support force $P_0$ is the thrust working on pinion 33, and the direction of force $P_0$ is perpendicular to the direction of force $W_0$. The partial forces of supporting force $P_0$ are partial force $P_1$ perpendicular to slope D, and partial force $P_2$ parallel to slope D. Partial forces $P_1$ and $P_2$ can be calculated using equations (3) and (4).

$$P_1 = P_0 \times \sin\theta \tag{3}$$

$$P_2 = P_0 \times \cos\theta \tag{4}$$

The sum of the force components perpendicular to slope D, that is, composite direct pressure R, is the sum of direct pressure $W_1$ and partial force $P_1$ as shown in equation (5).

$$R = W_1 + P_1 \tag{5}$$

If we let F be the maximum friction force between the tooth surface of pinion 33 and the tooth surface of rack 34, the magnitude of this maximum friction force F is proportional to composite direct pressure R as shown in equation (6).

$$F = \mu \times R \tag{6}$$

where $\mu$ is the coefficient of friction between the tooth surfaces of pinion 33 and rack 34, which are helical gears as noted above. If the friction angle of the helical gear corresponding to friction coefficient $\mu$ is $\rho$, then friction coefficient $\mu$ can be obtained from equation (7).

$$\mu = \tan\rho \tag{7}$$

Friction force F works in the direction opposite force $W_2$ because tooth E wants to slip along slope D and move to point A as a result of force $W_2$.

The relationship between the three forces F, $W_2$, and $P_2$ parallel to slope D is shown in equation (8).

$$P_2 = W_2 - F \tag{8}$$

Equation (9) is derived by substituting equations (1) to (6) in equation (8).

$$\begin{aligned}
P_o \times \cos\theta &= W_o \times \sin\theta - \mu \times R \\
&= W_o \times \sin\theta - \mu(W_i + P_1) \\
&= W_o \times \sin\theta - \mu(W_o \times \cos\theta + P_o \times \sin\theta) \\
&= W_o \times \sin\theta - \mu \times W_o \times \cos\theta - \mu \times P_o \times \sin\theta
\end{aligned} \tag{9}$$

which can be simplified as equations (10) and (11).

$$P_0 \times (\cos\theta + \mu \times \sin\theta) = W_0(\sin\theta - \mu \times \cos\theta) \tag{10}$$

$$P_0 = W_0(\sin\theta - \mu \times \cos\theta)/(\cos\theta + \mu \times \sin\theta) \tag{11}$$

Equation (12) is obtained by substituting equation (7) into equation (11).

$$\begin{aligned}
P_o &= W_o \times [(\sin\theta - \tan\rho \times \cos\theta)/(\cos\theta + \tan\rho \times \sin\theta)] \\
&= W_o \times [(\sin\theta - (\sin\rho/\cos\rho) \times \cos\theta)/(\cos\theta + (\sin\rho/\cos\rho) \times \sin\theta)] \\
&= W_o \times [(\sin\theta \times \cos\rho - \cos\theta \times \sin\rho)/(\cos\theta \times \cos\rho + \sin\theta \times \sin\rho)] \\
&= W_o \times [\sin(\theta - \rho)/\cos(\theta - \rho)] \\
&= W_o \times \tan(\theta - \rho)
\end{aligned} \tag{12}$$

As will be known from equation (12), $P_0 = 0$ where $\theta = \rho$. When $\theta < \rho$, $P_0 < 0$. Therefore, thrust does not act on pinion 33, that is, force $P_0$ does not work, even if a high torque acts on pinion 33 when rack 34 is stopped. Helix angle $\theta$ of the helical gear is therefore set in the range not exceeding helical gear friction angle $\rho$, that is, in the range $0° < \theta \leq \rho$.

When rack 34 is not stopped at either the right or left end of its movement range, that is, during most normal steering situations, and rack 34 is driven by pinion 33 to the right or left, the force with which tooth E of pinion 33 pushes on slope D is less than force $W_0$. The thrust working on pinion 33 corresponds to this weak force.

It is thus possible to limit the thrust acting on pinion 33 to a very low level.

An alternative embodiment in which input shaft 31 is connected skewed to rack shaft 35 is described next with reference to FIG. 9A and FIG. 9B.

Figure 9A:
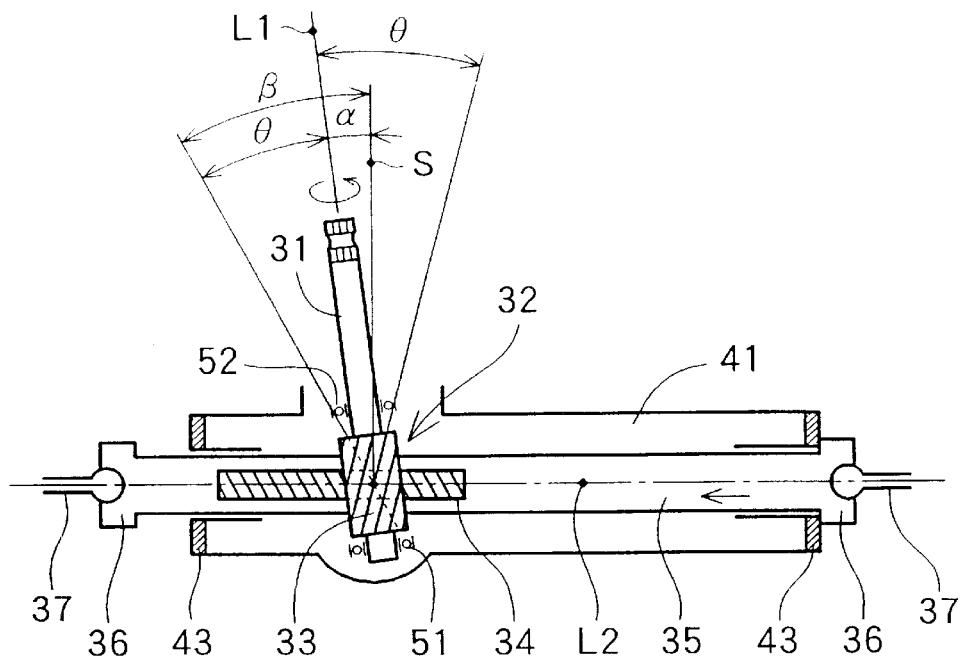
FIG. 9A and FIG. 9B show a variation of the rack and pinion mechanism of FIG. 8A.
Figure 9B:
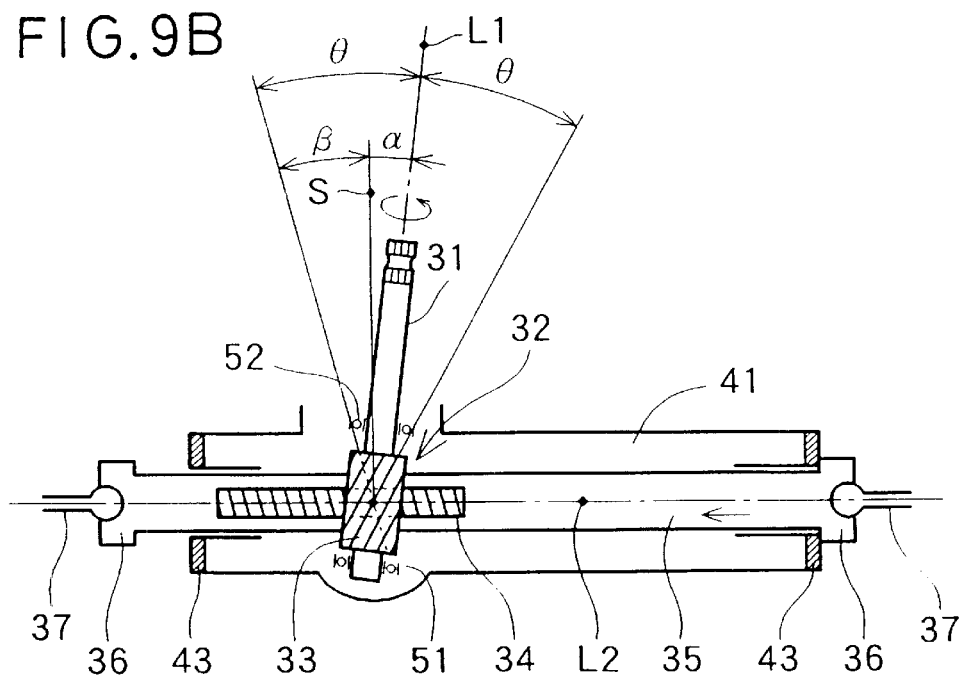

FIG. 9A shows a configuration in which input shaft 31 is skewed to the left by skew angle $\alpha$ from reference line S perpendicular to the center axis L2 of rack shaft 35. FIG. 9B shows a similar configuration in which the input shaft 31 is skewed to the right by skew angle $\alpha$ from reference line S.

In this example the helical gear rack 34 has helix angle $\beta$. The helix angle of rack 34 in FIG. 9A is $\beta = \theta + \alpha$. The helix angle of rack 34 in FIG. 9B is $\beta = \theta - \alpha$. The helix angle $\theta$ of pinion 33 is constant regardless of the skew angle $\alpha$ of input shaft 31. By thus maintaining a constant helix angle $\theta$ in pinion 33, thrust $P_0$ working on pinion 33 is also constant, and can be obtained from equation (12) above.

As described above, helix angle $\theta$ of pinion 33 is in the range not exceeding helical gear friction angle $\rho$, that is, in the range $0° < \theta \leq \rho$. Therefore, regardless of input shaft 31 skew angle $\alpha$, thrust does not act on pinion 33, that is, force $P_0$ does not work, even if a high torque acts on pinion 33 when rack shaft 35 movement stops.

To summarize the above, by using helical gears for pinion 33 and rack 34, it is possible to transfer relatively high torque compared with a spur gear. As a result, a relatively small rack and pinion mechanism 32 can be achieved.

Moreover, because the helix angle $\theta$ of pinion 33, which is a helical gear, is less than the helical gear friction angle $\rho$, the thrust acting on pinion 33 during normal steering situations, that is, when the rack 34 is not stopped at either right or left end, can be low. As a result, low thrust acts on input shaft 31 in FIG. 8A, FIG. 9A, and FIG. 9B, and the thrust acting on bearings 51, 52 supporting input shaft 31, and reduction mechanism 110 linked to input shaft 31 (see FIG. 4), is also low. Therefore, even though helical gears are used, it is not necessary to increase the strength of input shaft 31, bearings 51, 52, or reduction mechanism 110, and these components can therefore be made compact and low cost.

Figure 10:
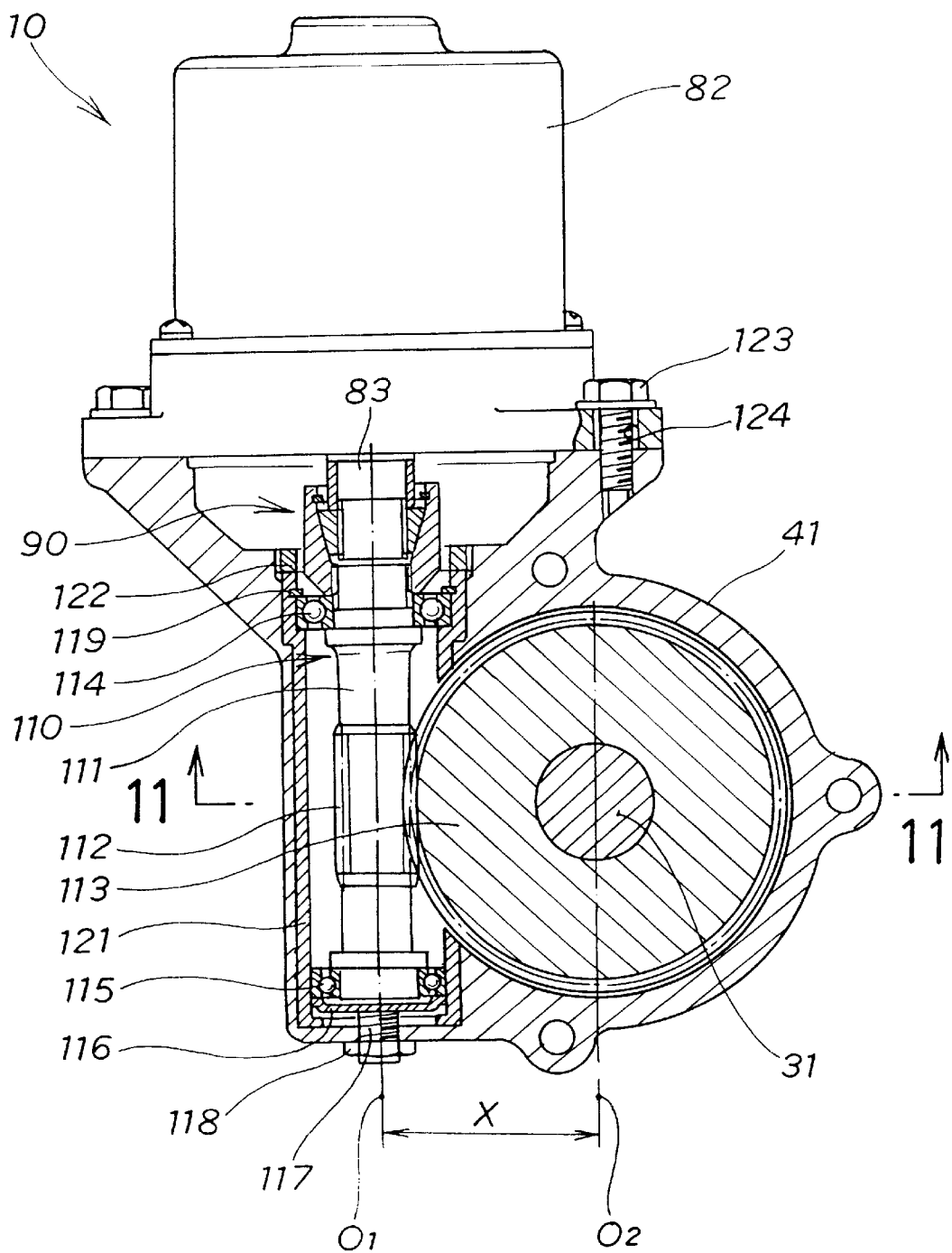
FIG. 10 is a sectional view of a variation of the geared reduction mechanism.

FIG. 10 shows an alternative version of the support structure for transfer shaft 111 in this reduction mechanism 110.

The support structure of this alternative embodiment is characterized by supporting transfer shaft 111 on housing 41 by way of intervening first and second bearings 114, 115 and eccentric sleeve 121. Eccentric sleeve 121 is a cylindrical sleeve fit rotatably in a hole in housing 41. The first and second bearings 114, 115 are fit inside the hole inside this cylindrical sleeve, and transfer shaft 111 is supported rotatably by the first and second bearings 114, 115. By using a ring bolt 122 to push eccentric sleeve 121 in the direction of the longitudinal axis of eccentric sleeve 121 to housing 41, the eccentric sleeve 121 can be held in housing 41 by friction.

Figure 11:
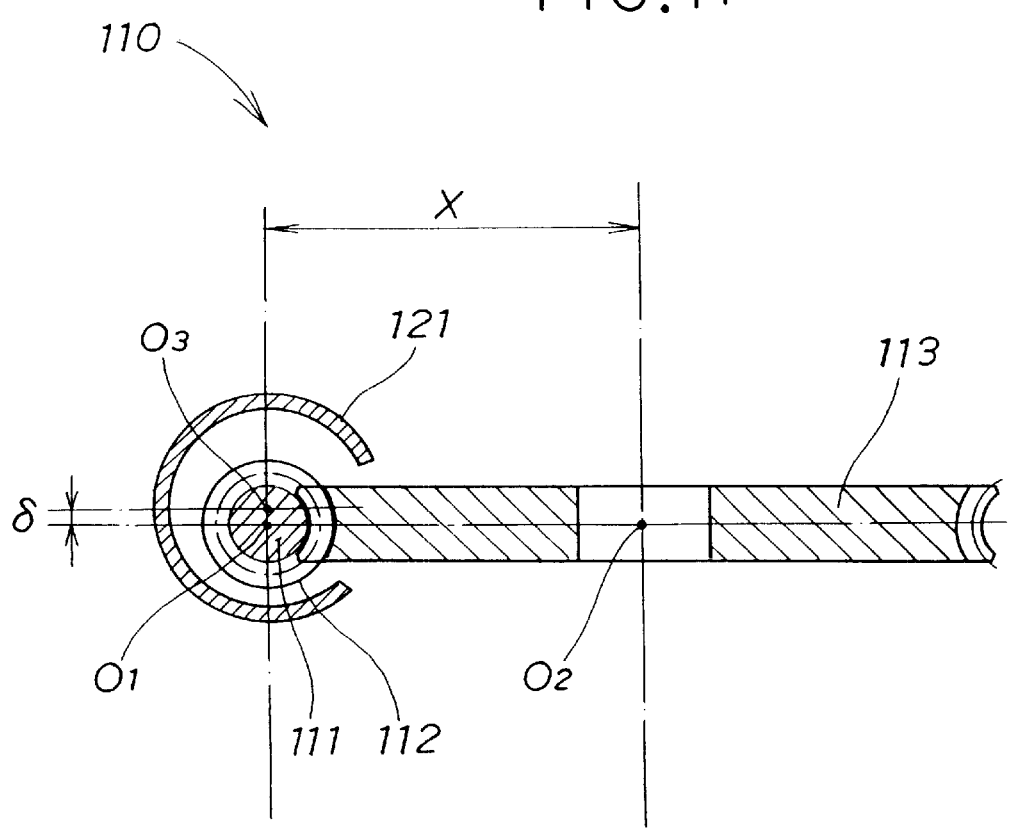
FIG. 11 is a sectional view taken along line 11—11 of FIG. 10.

FIG. 11 shows the relationship between worm 112, worm wheel 113, and eccentric sleeve 121.

As shown in FIG. 11, worm 112 is positioned with its center axis $O_1$. (center $O_1$ of transfer shaft 111) offset distance $\delta$ below the center axis $O_3$ of eccentric sleeve 121. Because transfer shaft 111 is supported by first and second bearings 114, 115 at this offset position of eccentric sleeve 121, the center axis $O_1$ of worm 112 moves eccentrically to worm wheel 113 of center axis $O_2$ when eccentric sleeve 121 rotates. As a result, the distance X from worm center $O_1$ to worm wheel 113 center $O_2$ changes. It is therefore possible to easily adjust for backlash of worm 112 to worm wheel 113 by simply turning eccentric sleeve 121. It should be noted that it is also preferable in this alternative version for the worm 112 to be metal, the tooth surfaces thereof to be coated with a low friction coefficient material, and the worm wheel 113 to be made from resin.

It is therefore possible to adjust the tooth surfaces of worm 112 and worm wheel 113 so that there is no backlash therebetween, and to apply pressure causing the tooth surfaces of worm 112 and worm wheel 113 to mesh. Eliminating backlash also eliminates play in the meshing of worm 112 and worm wheel 113, and thus prevents torque shock from the inertia of motor 82 (see FIG. 10) from working from the tooth surfaces of worm 112 to the tooth surfaces of worm wheel 113. The durability of reduction mechanism 110 is thus also further improved in this variation of this first preferred embodiment of the invention.

The procedure for adjusting meshing of this reduction mechanism 110 is as follows.

(1) With motor 82 and ring bolt 122 in FIG. 10 removed, eccentric sleeve 121 is gradually turned using a tool. This moves center axis 01 of transfer shaft 111 and thus allows adjusting backlash of worm 112 to worm wheel 113.

(2) After completing this backlash adjustment, ring bolt 122 is tightened to secure eccentric sleeve 121 to housing 41 by means of friction force.

(3) The assembly of torque limiter 90 and motor 82 is inserted to housing 41 and fit to transfer shaft 111.

(4) The motor 82 is mounted to housing 41 using bolt 123 to complete the task. Note that the diameter of bolt hole 124 in motor 82 is slightly larger than a normal bolt hole diameter. It is therefore possible to easily adjust the center of motor output shaft 83 to the center axis O1 of transfer shaft 111.

It will also be obvious to one with ordinary skill in the related art that torque limiter 90 of the present invention shall not be limited to a friction type torque limiter as described in the above first exemplary embodiment.

Furthermore, reduction mechanism 110 shall not be limited to a worm gear mechanism, and can be, for example, a bevel gear mechanism or spur gear mechanism.

Second Embodiment

An electric power steering apparatus according to a second preferred embodiment of the present invention is described next below with reference to the accompanying figures. Note that like parts in this second embodiment and the first embodiment described above are indicated by like reference numeral, and further description thereof shall be omitted below.

Figure 12:
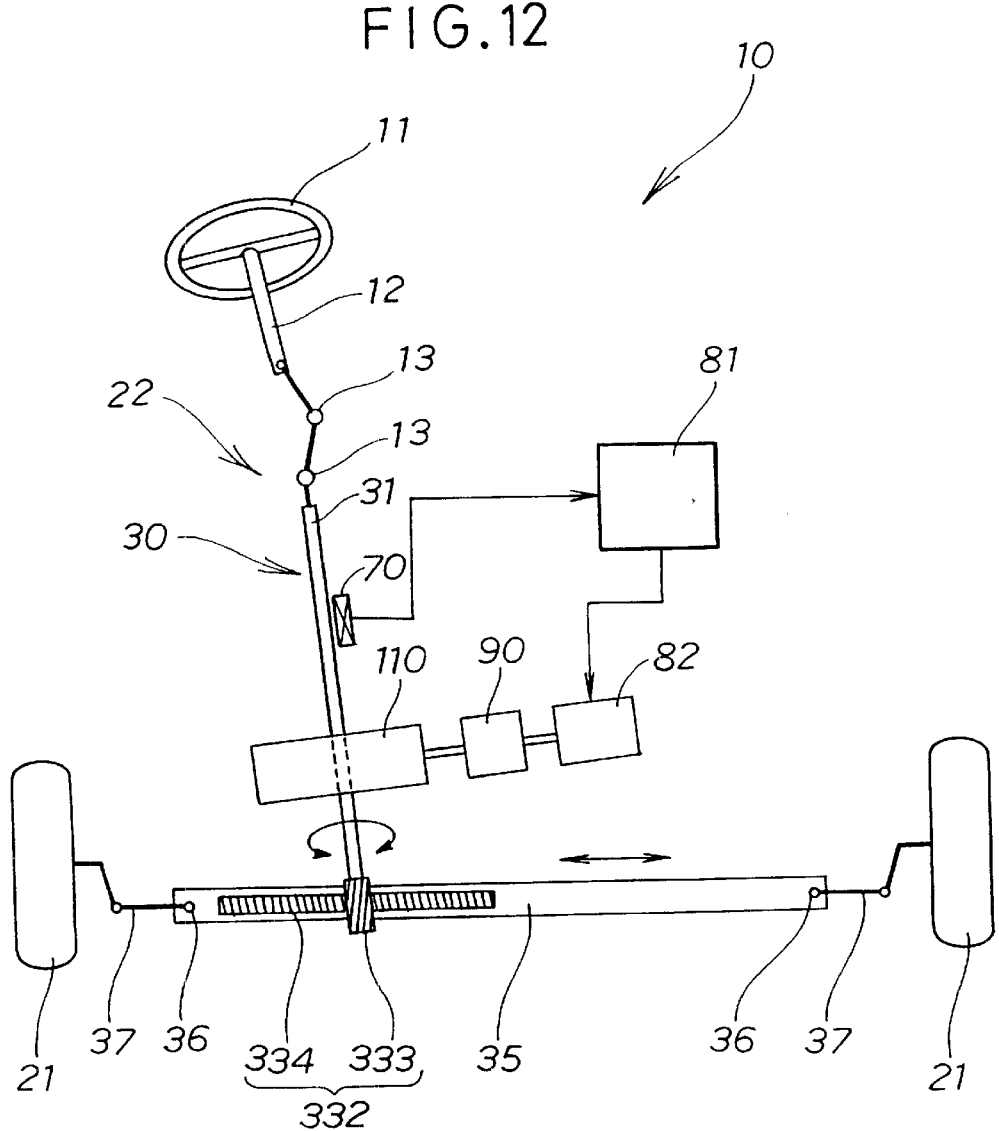
FIG. 12 is a schematic diagram of a vehicle steering system according to a second preferred embodiment of the present invention.

Referring to FIG. 12, electric power steering apparatus 10 according to the present embodiment comprises a steering mechanism 23 interposed to steering system 22 from steering wheel 11 to steered wheels (vehicle wheels) 21, and a torque assistance mechanism 24 for adding torque assistance to this steering mechanism 23.

The steering mechanism 23 comprises an input shaft 31 connected to steering wheel 11 by intervening steering shaft 12 and universal joints 13, and a rack and pinion mechanism 332 linked to input shaft 31.

The rack and pinion mechanism 332 comprises pinion 333 disposed to input shaft 31, and rack shaft 35 having a rack 334 meshing with pinion 333.

Right and left steered wheels 21 are connected by way of right and left tie rods 37 to the ends of rack shaft 35.

Torque assistance mechanism 24 comprises steering torque sensor 70 for detecting the steering torque produced in the steering system 22 by steering wheel 11; controller 81 for producing a control signal based on the detection signal supplied thereto by steering torque sensor 70; motor 82 for generating assist torque according to the steering torque based on the control signal; and the input shaft 31 and rack and pinion mechanism 332 connected to motor 82 by way of intervening torque limiter 90 and reduction mechanism 110.

In other words, the steering mechanism 23 and torque assistance mechanism 24 share input shaft 31 and rack and pinion mechanism 332 to apply torque assistance from torque assistance mechanism 24 to the steering mechanism 23. The steering torque sensor 70 is mounted to the steering mechanism 23.

With an electric power steering apparatus 10 thus comprised, the steering torque produced by a driver turning the steering wheel 11 can be transferred to the rack shaft 35 by way of intervening input shaft 31 and rack and pinion mechanism 332.

In addition, steering torque sensor 70 detects the steering torque, controller 81 generates a control signal based on the detection signal supplied from steering torque sensor 70, motor 82 produces torque assistance according to the steering torque based on this control signal, and this assist torque is transferred to the rack shaft 35 by way of intervening torque limiter 90, reduction mechanism 110, input shaft 31 and rack and pinion mechanism 332. Therefore, the right and left steered wheels 21 are steered by way of rack shaft 35 and right and left tie rods 37 as a result of the composite torque combining the torque assistance produced by motor 82 added to the steering torque produced by the driver.

Figure 13:
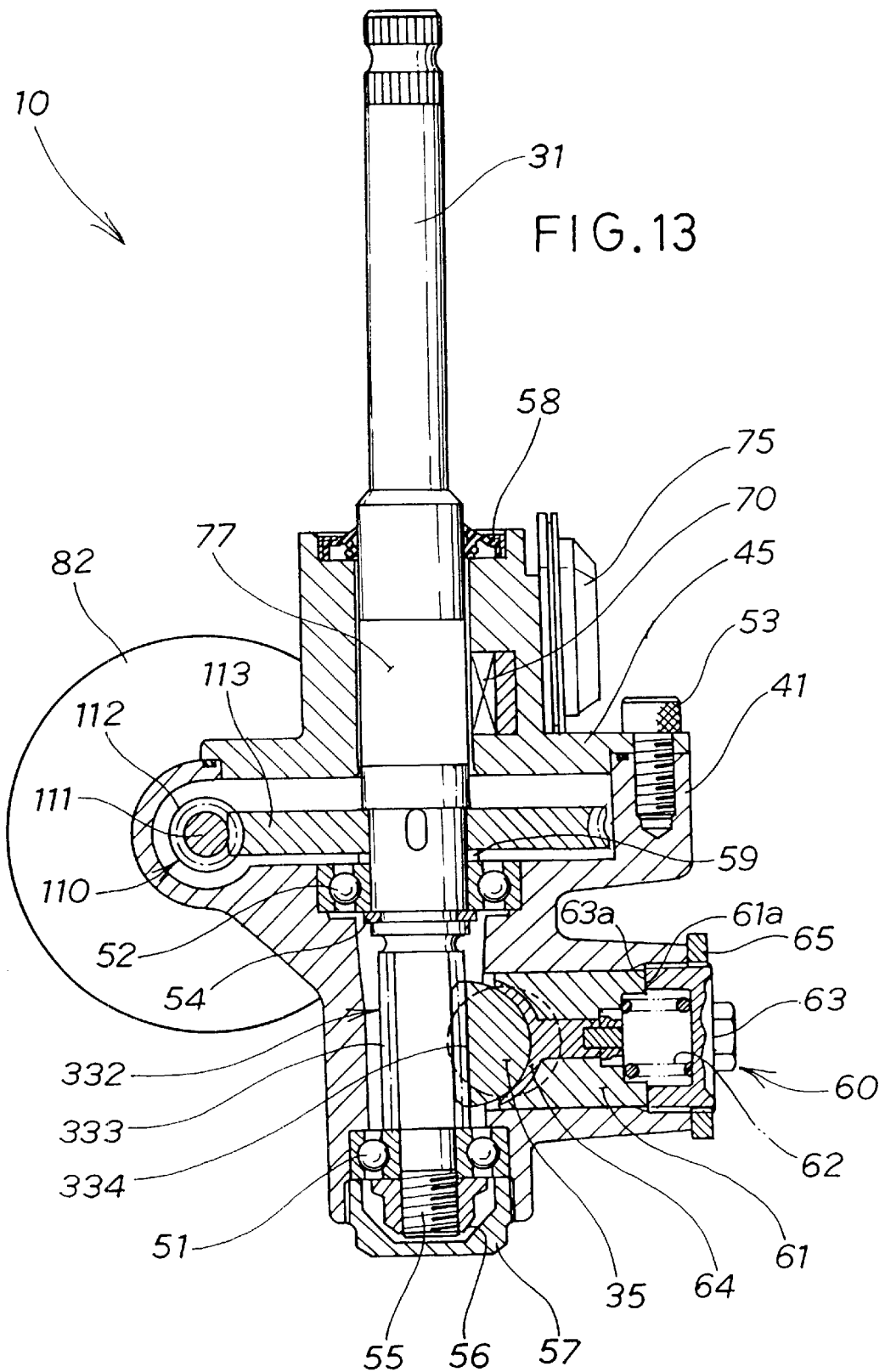
FIG. 13 is a sectional view of the electric power steering apparatus shown in FIG. 12.

FIG. 13 is a section view corresponding to FIG. 4 of the first embodiment, and shows a vertical section of the electric power steering apparatus 10.

A characteristic of this second preferred embodiment is that the pinion 333 and rack 334 are forgings (including roll forgings) or other plastically processed components. More specifically, input shaft 31 is a pinion shaft having threads 55 formed on the bottom end thereof with pinion 333 formed integrally to input shaft 31 at the bottom end above threads 55. The top end of input shaft 31 protrudes to the outside from lid 45. Rack 334 is formed on rack shaft 35.

The rack guide 60 is characterized by end 63a of adjustment bolt 63 pushing directly against the back 61a of guide member 61 when rack 334 is meshed with pinion 333. The reason for this is described below.

When the composite torque combining the assist torque of motor 82 (see FIG. 12) and the steering torque is transferred from pinion 333 to rack 334, longitudinal force in the axial direction and transverse force in the direction perpendicular to the axial direction act on rack shaft 35. This transverse force works to back up rack 334 and separate it from pinion 333, and is a partial force produced according to the pressure angle of the tooth profile. When further movement of the rack shaft 35 is limited after it slides a specific distance, this partial force in particular is extremely great compared with normal steering conditions.

With a conventional rack guide a guide member contacts rack shaft 35 from the side opposite rack 334 when rack 334 meshes with pinion 333, and this guide member is simply pushed by an adjustment bolt and an intervening compression spring. The rack 334 can thus back up because the compression spring can be compressed by a large force perpendicular to the axial direction.

In our invention, however, end 63a of adjustment bolt 63 pushes directly against the back 61a of guide member 61 when rack 334 meshes with pinion 333. There is, therefore, no compression spring to be compressed by transverse force perpendicular to the axial direction, and the rack 334 will not back up. It is therefore possible to maintain constantly good contact between the teeth of pinion 333 and rack 334, and constantly high gear meshing precision can be maintained.

The steering torque sensor 70 can be comprised as follows. That is, a magnetostriction film 77 of which the magnetostriction characteristics change according to the applied torque is disposed with a specific width around the complete circumference of input shaft 31. Excitation and detection coils 71, 72 as shown in FIG. 2 and described in the first embodiment above are positioned relative to this magnetostriction film 77. When torque acts on magnetostriction film 77 by way of input shaft 31, detection coil 72 electrically detects the magnetostriction of magnetostriction film 77 according to the torque. An exemplary magnetostriction film 77 is a ferromagnetic film formed by vapor deposition of a Ni—Fe alloy film on input shaft 31.

The relationship between input shaft 31 in this second embodiment and motor 82, torque limiter 90, and reduction mechanism 110 is the same as that shown in FIG. 5 with respect to the first embodiment above.

The torque limiter 90 of this second embodiment is also identical in structure and operation to the torque limiter torque limiter 90 shown in FIG. 6 with respect to the first embodiment above.

FIG. 14 and FIG. 15 are perspective and sectional views of the rack shaft in this second embodiment.

Rack shaft 35 is a round rod of diameter D1 with rack 334 formed at a longitudinal part thereof. The length M of the part 39 where rack 334 is formed is long enough to permit rack shaft 35 to slide right and left only up to the maximum steering angle of the steered wheels 21 (see FIG. 12). L2 designates a center axis of the rack shaft.

As shown in FIG. 15, tooth width W1 of the rack 334 formed on rack shaft 35 is greater than diameter D1 of rack shaft 35 in that part of the rack shaft 35 where rack 334 is not formed, that is, W1>D1.

The rack 334 formation part 39 has a basically semicircular section with the rack formation surface flat. Thickness T1 is reduced by an amount commensurate with the increase in tooth width W1. Thickness T1 is the thickness from the crown of rack 334 to the back of rack shaft 35, and is obviously less than diameter D1 (T1<D1). By thus increasing the diameter of rack shaft 35 only by the increase in the tooth width in the area of rack 334, the overall weight of rack shaft 35 can be limited.

The mechanical strength (bending strength and bearing strength) of rack 334 is greatly improved as a result of increasing the tooth width W1 of rack 334. At the same time the part of rack shaft 35 where rack 334 is not formed only slides in order to turn the steered wheels, and the rack shaft therefore only needs to be as rigid as a conventional rack shaft. Because the width of the rack shaft 35 in the area of pinion 33 and rack 34 is increased only by the amount of tooth width W1 and the thickness T1 of this area is decreased a comparable amount relative to diameter D1 of the rack shaft 35, rack formation part 39 is offset to the pinion side from rack shaft center axis L2 (see FIG. 13).

The section area of rack formation part 29 is therefore substantially identical to the section area of rack shaft 35, and there is substantially no change in the weight of rack shaft 35 even though width W1 in the rack formation part 39 is greater than diameter D1 of rack shaft 35. It is therefore possible to limit the overall weight of rack shaft 35.

By increasing the width W1 of rack 334, it is possible to limit the weight of rack shaft 35 while simultaneously increasing the mechanical strength (bending strength and bearing strength) of pinion 333 and rack 334 as described above.

Moreover, because rack shaft 35 is pushed to pinion 333 by rack guide 60 (see FIG. 13) from the side opposite rack 334, reducing thickness T1 has no practical effect on the bending rigidity of rack shaft 35.

FIG. 16 illustrates a method for manufacturing a rack shaft according to this second embodiment.

Figure 16A:
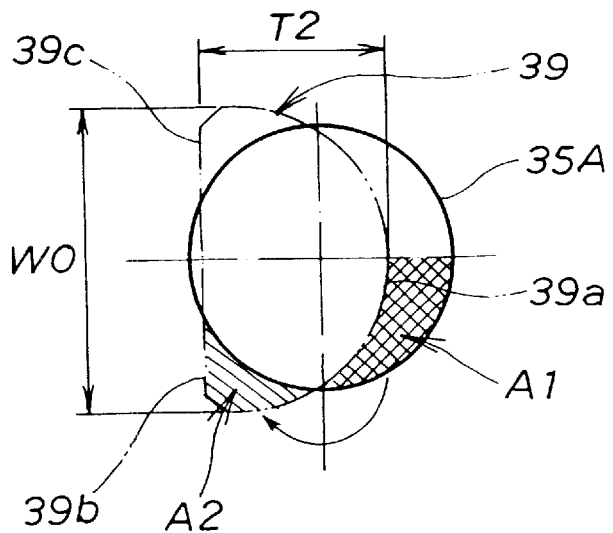
FIG. 16 shows the manufacturing steps for the rack shaft shown in FIG. 15.

First, referring to FIG. 16(a), the rack formation part 39 only of steel rod 35A is forged to the desired substantially semicircular section indicated by the double-dot dash line. Note that the section area A1 behind back 39a of rack formation part 39 is substantially equal to the section area A2 of the protruding lower part 39b or upper part 39c of rack formation part 39. In other words, by forging rack formation part 39 to width W0, section areas A1 and A2 are substantially identical, and width T2 is thus determined. Therefore, the section area of rack formation part 39 indicated by the double-dot dash line, and the section area of rod 35A indicated by the solid line, are substantially equal, and there is no change in the weight of rack shaft 35 even though width W of rack formation part 39 is greater than the diameter of rod 35A.

Figure 16B:
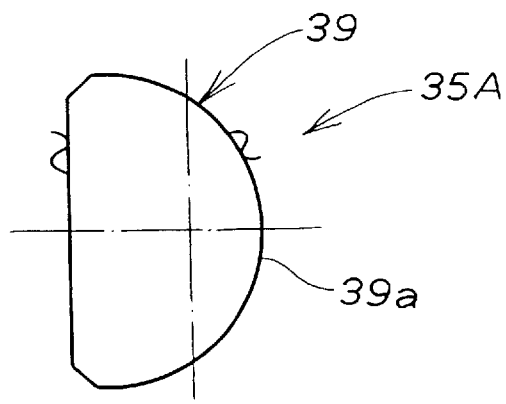

FIG. 16(b) is a section view of the rack formation part 39 resulting from this forging step.

Figure 16C:
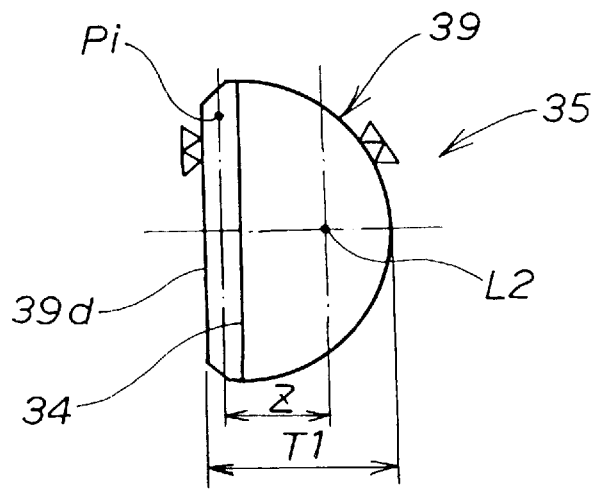

The surface of rack formation part 39 is then machined smooth as shown in FIG. 16(c), and rack 334 is formed on the flat face (rack formation face) 39d by roll forging or other process to finish production.

The pinion 333 and rack 334 according to this second embodiment are helical gears similar to the pinion 33 and rack 34 of the first embodiment shown in FIG. 7A to FIG 7D, and are identical in structure and operation.

Figure 17:
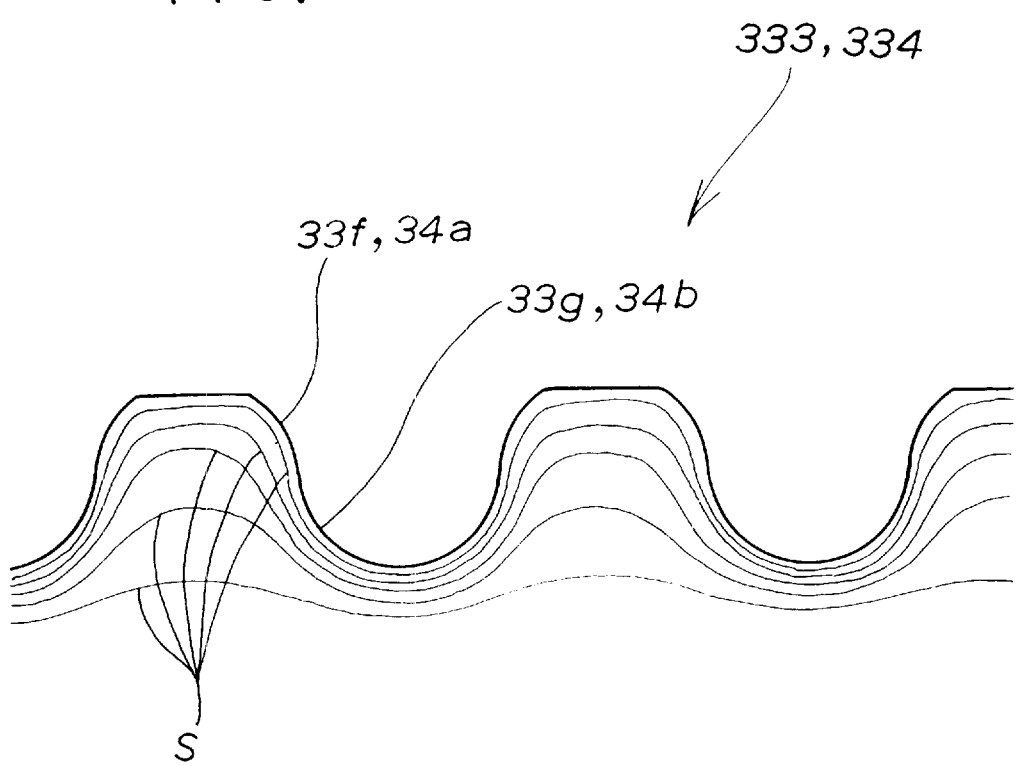
FIG. 17 is a schematic diagram of the tooth profile of a pinion and rack in the second embodiment.

FIG. 17 is a schematic diagram of the tooth profile of the pinion and rack in this second embodiment. The fiber structure S of the tooth profile of pinion 333 and the tooth profile of rack 334 flows continuously along the tooth profile. This fiber structure S is also commonly referred as the metal fibers (process fibers), and is referred as metal flow lines in the case of forgings.

As noted above, pinion 333 and rack 334 are plastically processed, and the tooth profile of pinion 333 and rack 334 is a circular arc.

Plastically processed components are processed components that have been manufactured to a specific shape and dimension by hot or cold plastic deformation of a material, and include, for example, rolled components and forged components such as roll forgings Roll forging is a type of rolling process, and is included as a forging process in the present invention. To achieve the tooth profiles of the pinion 333 and rack 334 by means of roll forging, a tool with the desired tooth profile is gradually pressed into the material to achieve the specified tooth profile. Roll forging offers high productivity and enables continuous production.

Some advantages of plastically processed gears compared with machined gears include the following.

(1) A continuous fiber structure S following the tooth profile can be obtained as shown in FIG. 17, thereby increasing strength, and offering greater bending strength and wear resistance in the gear teeth compared with machined gears in which the fiber structure S is interrupted (not continuous).

(2) There is no residual stress produced in the tooth surfaces as there is with machining processes, and there is thus less deformation during hardening. It is therefore possible to maintain good meshing without correcting the tooth profile after hardening in order to assure the required finishing precision in the circular arc tooth profile gears. The manufacturing process is thus shortened, and productivity improved.

(3) Marks (process marks) determined by the tip shape and the feed rate of the tool used for surface machining are left on the tooth surfaces of machined gears.

Gears manufactured with a plastic process, however, have no process marks left on the tooth surface by the machining process, can be manufactured to a uniform surface roughness oil the tooth surfaces, have a smooth surface roughness on the teeth, and little variation in dimensional precision. Friction from sliding tooth surfaces is therefore extremely low, the transfer efficiency of the rack and pinion mechanism is high, and meshing noise is low.

FIG. 18 and FIG. 19 show a variation of this embodiment in which the rack shaft is made from a pipe material.

As shown in FIG. 18 and FIG. 19, rack shaft 35B has threads 35a formed on each longitudinal end thereof for connecting ball joints 36. A flat 35b is formed a specific distance Y1 from center L2 of rack shaft 35B on the side facing pinion 333, and rack 334 is formed on this flat 35b.

A method for manufacturing a rack shaft as shown in FIG. 18 is described next with reference to FIG. 20.

(1) Steel pipe stock 35C is prepared.

(2) Reduce one end of pipe stock 35C to form thread formation part 35c.

(3) Crimp a longitudinal part of pipe stock 35C in a press to form a flat 35b with a shape as shown in FIG. 20A.

(4) Plastically process flat 35b, such as by roll forging, to form rack 334 (see FIG. 20B).

(5) Using an ironing process, form thickness deviations in pipe stock 35C resulting in thick wall part 35d and thin wall part 35e.

(6) Reduce the other end of pipe stock 35C to form thread formation part 35f.

(7) Thread the right and left to form thread formation parts 35c and 35f to produce threads 35a, thus completing rack shaft 35B from pipe stock.

Third Embodiment

An electric power steering apparatus according to a fourth preferred embodiment of the invention is described next below with reference to FIG. 21 to FIG. 27.

FIGS. 21 and 22 are a plan and sectional view, respectively, of rack shaft 35 and a rack and pinion mechanism 432 as an alternative embodiment of the rack and pinion mechanism shown in FIG. 12 according to a second embodiment. It should be noted that parts identical to those described in relation to the first embodiment are identified by like reference numerals and their description will be omitted.

Referring to FIG. 21 and FIG. 22, center line L2 is the axis of end 35g of rack shaft 35 supported by housing 41 during normal conditions. Center line L4 is the axis of rack formation part 39 where rack 434 is formed on rack shaft 35. Rack shaft 35 according to this preferred embodiment is characterized by center L4 of rack formation part 39 being offset distance Q to the side opposite rack 434, that is, back 39f of flat 39e on which rack 434 is formed.

Figure 23:
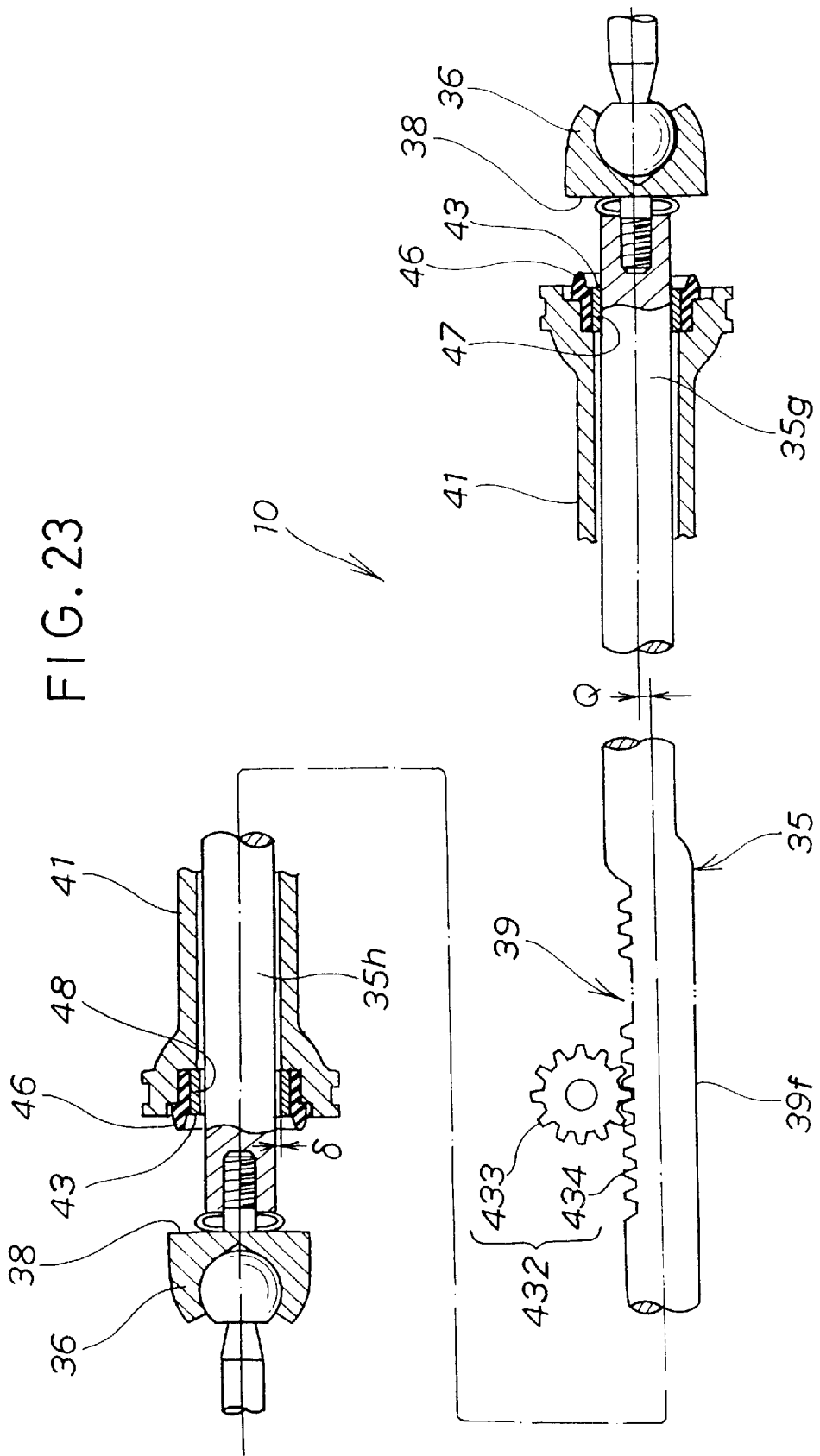
FIG. 23 is a plan section view of the rack shaft shown in FIG. 21.

As shown in FIG. 23, housing 41 has first bearing 47 and second bearing 48 on opposite longitudinal ends thereof. Housing 41 supports rack shaft 35 slidably in the longitudinal direction thereof by way of intervening first and second bearings 47, 48.

The first bearing 47 supports end 35g of rack shaft 35, that is, the end farthest from rack 434. The second bearing 48 supports the other end 35h of rack shaft 35, i.e., the end closest to rack 434, with a slight gap δ therebetween. When the other end 35h deflects a distance equal to gap δ due, e.g., to road reaction, other end 35h can be supported by second bearing 48.

Figure 31:
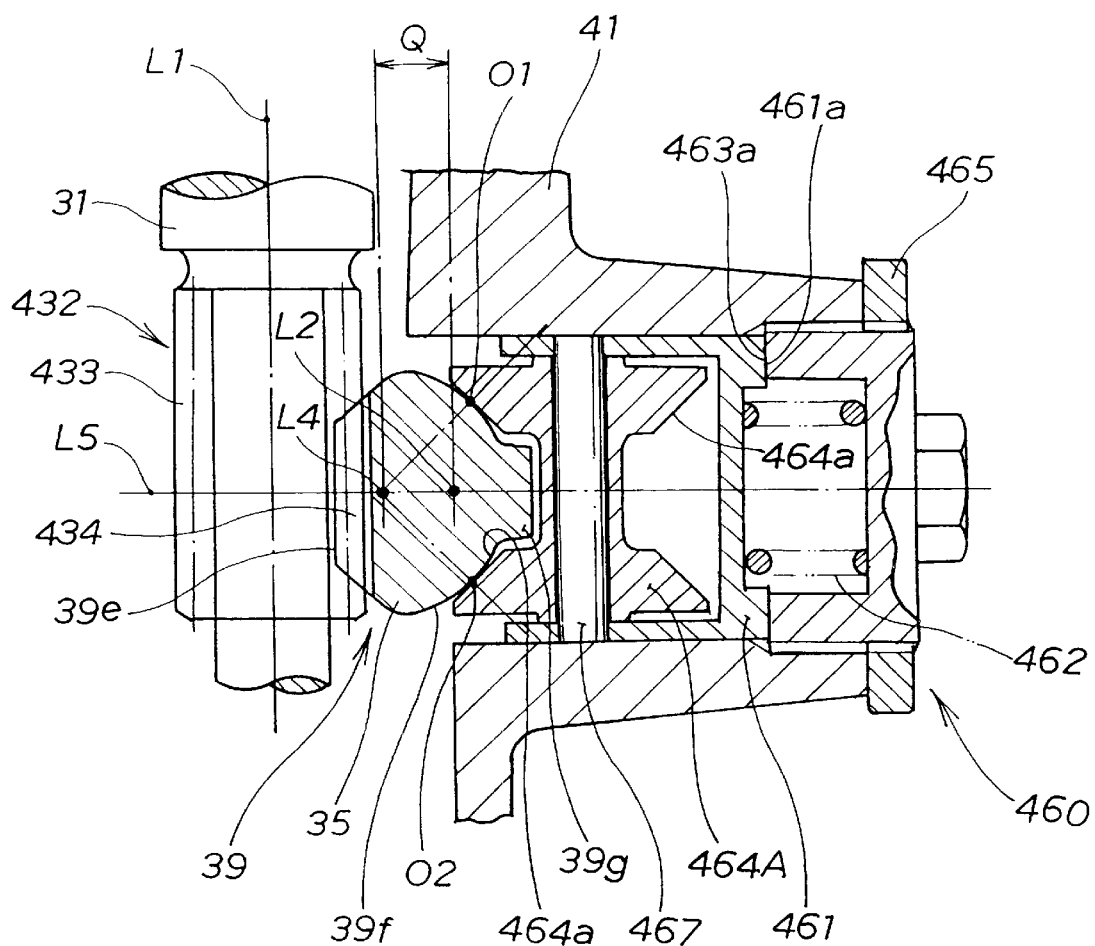
FIG. 31 is a sectional view of a second variation of the third embodiment wherein the contact part of the rack guide is a rotating body.

The first and second bearings 47, 48 have a stopper 43 on the longitudinal end side thereof. When rack shaft 35 slides a specific distance to the left, the rack end 38 of the right ball joint 36 contacts stopper 43. When rack shaft 35 slides a specific distance to the right, the rack end 38 of the left ball joint 36 contacts stopper 43. The maximum steering angle of the right and left steered wheels 21 (see FIG. 12) can thus be limited by restricting movement of rack shaft 35. That is, when rack shaft 35 moves to the end of its movement range, the right and left steered wheels 21 are at the maximum steering angle. Note that dampers 46 are also shown in FIG. 31.

Figure 24:
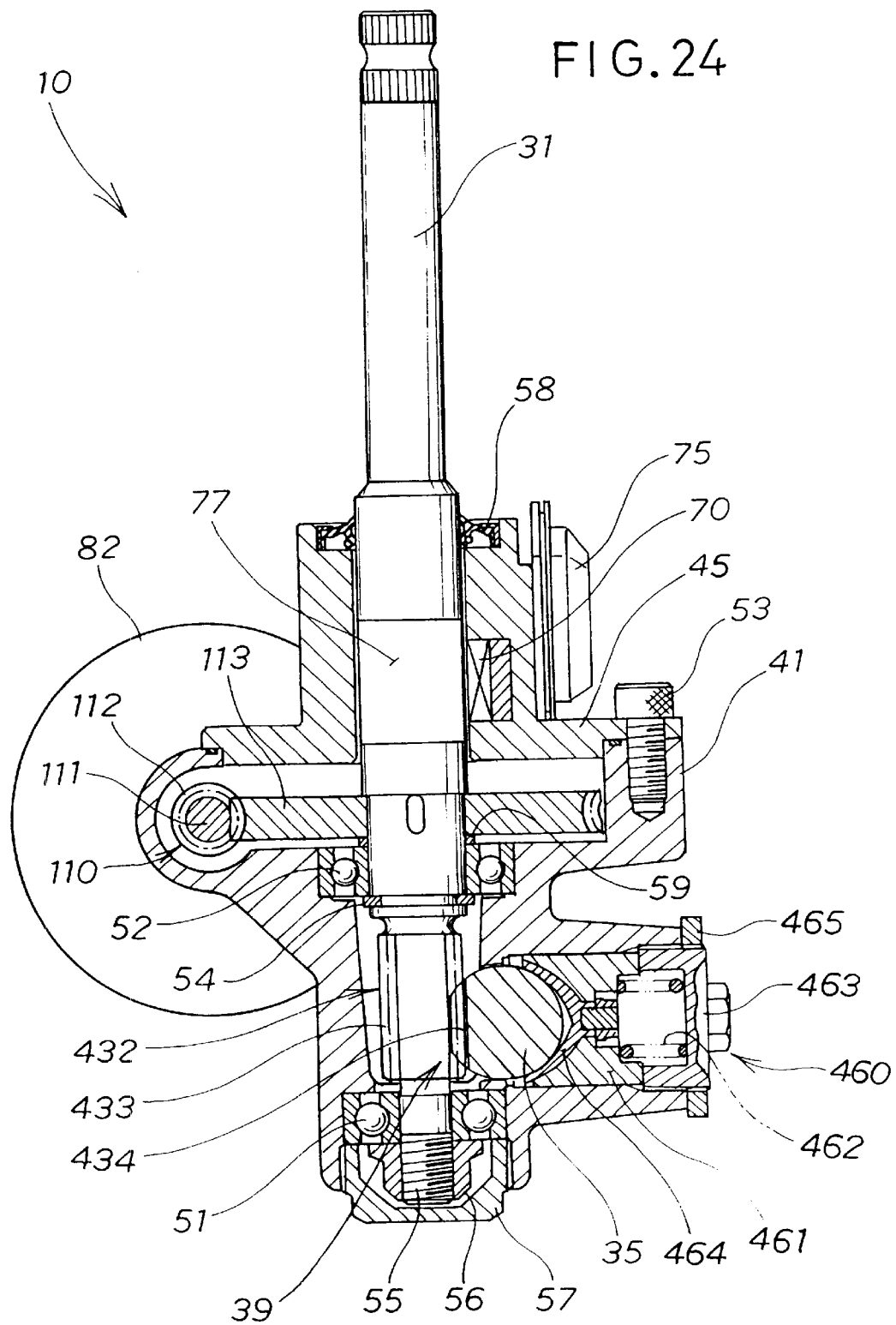
FIG. 24 is a sectional view of the electric power steering apparatus according to the third preferred embodiment.

FIG. 24 is a sectional view of an electric power steering apparatus 10 according to the third preferred embodiment of the invention, and is equivalent to the sectional view of FIG. 4 for the first embodiment.

As shown in FIG. 24, electric power steering apparatus 10 houses input shaft 31, rack and pinion mechanism 432, steering torque sensor 70, torque limiter 90 (see FIG. 12), and reduction mechanism 110 in housing 41, and covers the top opening to housing 41 with lid 45. The steering torque sensor 70 is mounted to housing 41 or lid 45.

The housing 41 rotatably supports the bottom end and longitudinal middle part of input shaft 31 by means of two bearings 51 and 52. The housing 41 further has a rack guide 460. Also shown are lid mounting bolt 53 and lock ring 54.

Threads 55 are formed an the bottom end of input shaft 31 with pinion 433 integrally disposed to input shaft 31 just above threads 55. The top end of input shaft 31 protrudes from the top of lid 45. Rack 434 is formed on rack shaft 35. Movement in the longitudinal direction of input shaft 31 is limited by threading a nut 56 onto threads 55. Also shown are cap nut 57, oil seal 58, and spacer 59.

In addition to the configuration of the first embodiment shown in FIG. 2A and FIG. 2B, steering torque sensor 70 can be constructed as follows. That is, a magnetostriction film 77 of which the magnetostriction characteristics change according to the applied torque is disposed with a specific width around the complete circumference of input shaft 31. Excitation and detection coils 72, 72 as shown in FIG. 2A and FIG. 2B are positioned relative to this magnetostriction film 77. When torque acts on magnetostriction film 77 by way of input shaft 31, detection coil 72 electrically detects the magnetostriction of magnetostriction film 77 according to the torque. An exemplary magnetostriction film 77 is a ferromagnetic film formed by vapor deposition of a Ni—Fe alloy film on input shaft 31.

The relationship between input shaft 31, motor 82, torque limiter 90, and reduction mechanism 110 in this embodiment is the same as that shown in FIG. 5 with respect to the first embodiment above.

The torque limiter 90 of this embodiment is also identical in structure and operation to the torque limiter torque limiter 90 shown in FIG. 6 with respect to the first embodiment above, and further description thereof is omitted below.

Figure 25:
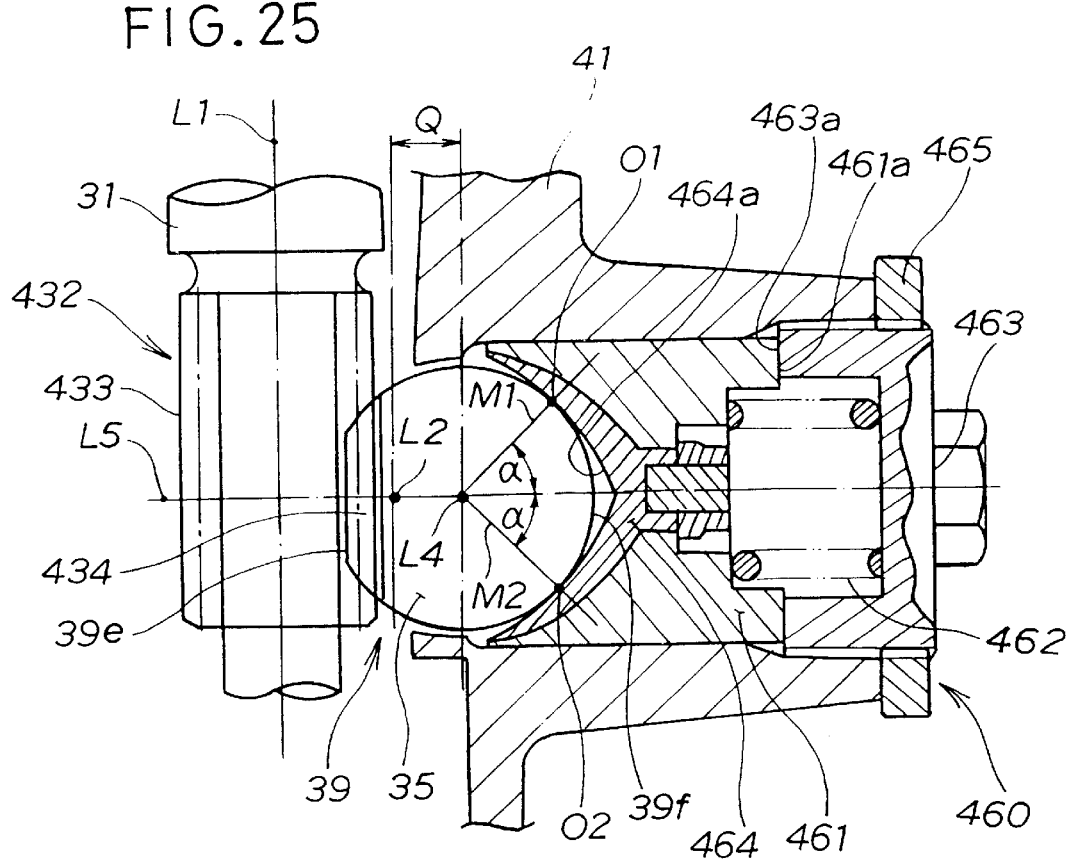
FIG. 25 is a sectional view of the rack and pinion mechanism and rack guide mechanism in the third preferred embodiment.
Figure 26:
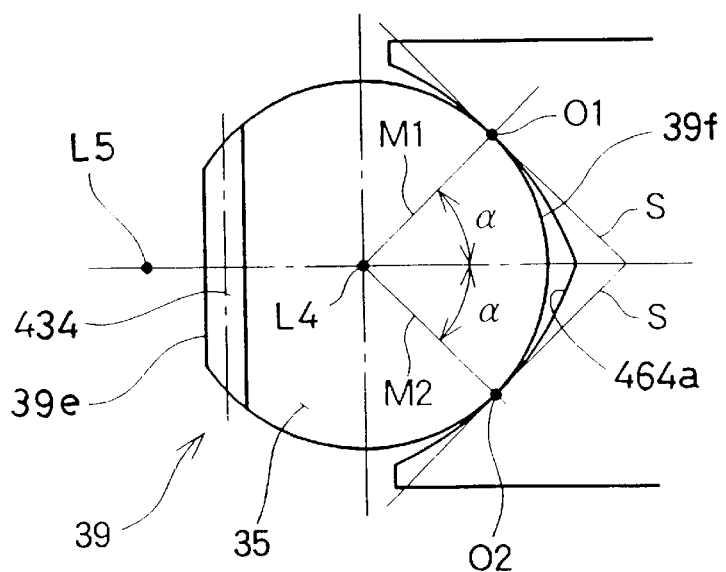
FIG. 26 shows the action of the rack shaft and rack guide shown in FIG. 25.

FIGS. 25 and 26 are section views of the rack and pinion mechanism 32 and rack guide 460 in the third preferred embodiment of the invention, and show the working relationship between rack shaft 35 and concave end 464a of rack guide 460.

The back 39f of flat 39e where rack 434 is formed, that is, the side of rack shaft 35 opposite the rack 434, is convex so that the concave end 464a of rack guide 460 pushes this convex surface toward the rack 434 side.

Rack guide 460 comprises a guide member 461 contacting back 39f of rack shaft 35, and an adjustment bolt 463 for urging back 461a of guide member 461 toward rack shaft 35 by way of intervening compression spring 462.

By appropriately setting adjustment bolt 463 in housing 41 with this rack guide 460, compression spring 462 pushes guide member 461 with appropriate force against rack 434, and thereby pushes rack 434 against pinion 433.

Rack shaft 35 is made from rod stock with a flat 39a formed at that part facing pinion 433. The rack 434 is formed on this flat 39e. The back 39f of flat 39e on which rack 434 is formed is a convex surface having an arc of which the center is center axis L4 of rack shaft 35.

The guide member 461 has a contact 464 on the end thereof enabling back 39f of rack shaft 35 to slide smoothly. Note that contact 464 can be formed integrally to guide member 461. This contact 464 has a concave end 464a. As a result, guide member 461 has a concave end 464a. Note that the arc components defining the shape of this concave end 464a have a radius greater than the radius of the convex circular arc surface of back 39f. Note that a lock nut 465 is also shown.

FIG. 25 and FIG. 26 are section views perpendicular to the axis of rack formation part 39 where rack 434 is formed. Let line L4 be the center of rack formation part 39, line L1 be the center of pinion 433, and reference line L5 be orthogonal to line L1. As will be known from these figures, the top and bottom arcs of concave end 464a are linearly symmetrical to reference line L5.

If back 39f of rack shaft 35 contacts concave end 464a at contact points 01 and 02, M1 is the line through top contact point 01 and center L4, and line M2 is through bottom contact point 02 and center L4, the slope of line M1 to reference line LS and the slope of line M2 to reference line L5 are both α. Lines M1 and M2 are also perpendicular to tangents S of the arc of back 39f.

Figure 27:
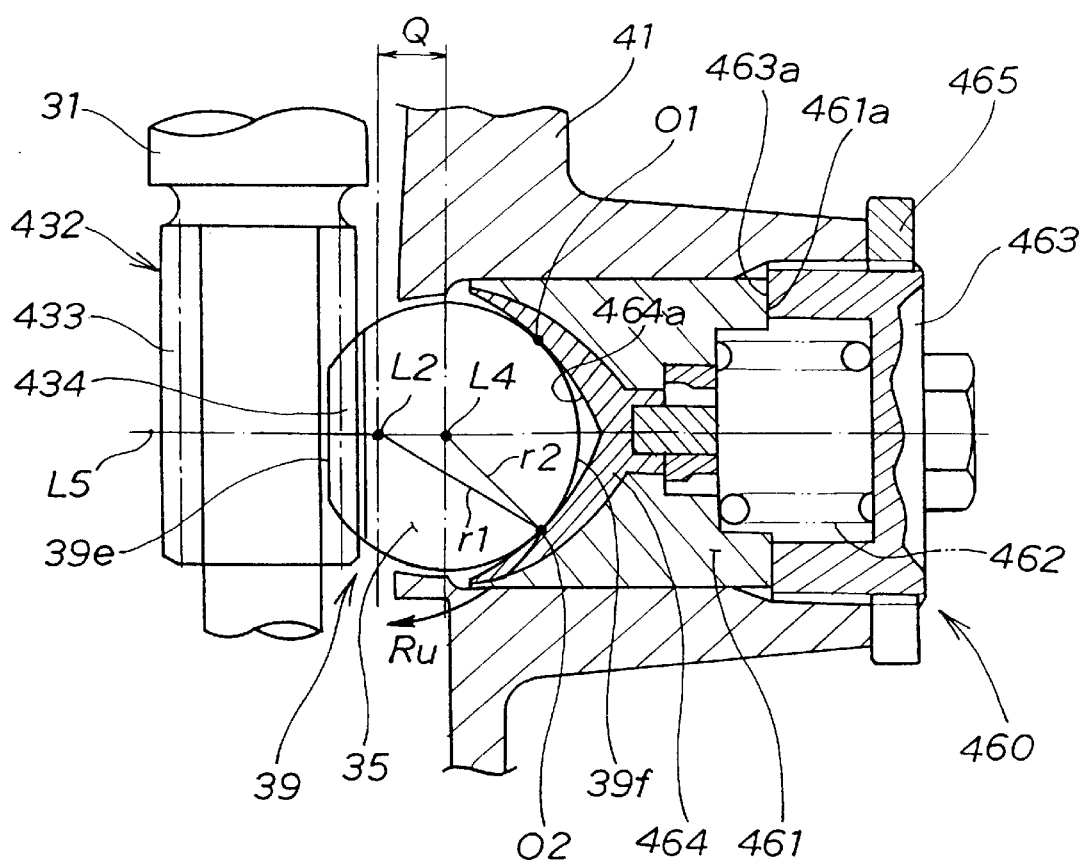
FIG. 27 is a sectional view showing the action of the rack and pinion mechanism and rack guide shown in FIG. 25.

FIG. 27 is a working diagram corresponding to FIG. 25 for the rack and pinion mechanism and rack guide.

When a rocking force occurs in conjunction with steering as a result of using helical gears for pinion 433 and rack 434, or chassis vibration travels to rack and pinion mechanism 432, the vibration or rocking force acts on rack shaft 35. If there is a slight gap between rack and pinion mechanism 432 and associated components, rack shaft 35 will conceivably oscillate due to this rocking force. Some factors contributing to such a gap include the following.

(1) A gap develops due to wear between the tooth surfaces of pinion 433 and rack 434.

(2) When a load acts on rack and pinion mechanism 432, (1) an extremely small gap develops in the bearings 51 and 52 supporting input shaft 31 (see FIG. 24), or (2) slight elastic deformation occurs in the guide member 461, which is made from a resin material, or play (a small gap) develops in related parts.

The third embodiment of the present invention is characterized by setting the positions of first and second contact points 01 and 02 to center L2 of rack shaft 35 supported by housing 41 so that rocking of the convex part (back 39f) of rack shaft 35 is limited at concave end 464a when a rocking force acts on the rack shaft 35.

More specifically, back 39f of rack shaft 35 is a convex surface with an arc of radius r2 with its center at center L4 (point L4) of the rack formation part 39 where rack 434 is formed. The positions of first and second contact points 01 and 02 are therefore on back 39f. Arc radius r2 of the convex surface is equal to the distance from center L4 to contact points 01, 02.

The position of center L4 of rack formation part 39 is offset distance Q toward back 39f from center L2 of rack shaft 35. The distance from center L2 to contact point 01 is r1, and distance r1 is the rocking radius when a rocking force acts on rack shaft 35. It will be obvious that rocking radius r1 is greater than arc radius r2 (r1>r2).

When rack shaft 35 attempts to roll clockwise as seen in the figure from center L2 (in the direction of arrow Ru), back 39f is limited by concave end 464a at contact point 02. Rack shaft 35 is therefore unable to rock. Likewise when rack shaft 35 attempts to roll counterclockwise as seen in the figure from center L2, back 39f is limited by concave end 464a at contact point 01. Rack shaft 35 is again therefore unable to rock.

The rack shaft 35 is thus housed so that it can slide longitudinally to housing 41 but cannot rock therein. Furthermore, rack shaft 35 will not rock even when a rocking force works on rack shaft 35 during steering. The rack 434 will therefore become skewed to pinion 433, and high precision meshing of pinion 433 and rack 434 can thus be maintained.

The rack guide 460 is characterized by end 463a of adjustment bolt 463 pushing directly against back 461a of guide member 461, that is, the end opposite that where concave end 464a is formed, when rack 434 engages pinion 433 as shown in FIG. 27. The reason for this is the same as described above with reference to FIG. 13 and the second embodiment, and further description thereof is omitted.

The pinion 433 and rack 434 of rack and pinion mechanism 432 are helical gears and identical in configuration and action to the pinion 33 and rack 34 shown in FIGS. 7A to 7D of the first embodiment, and further description thereof is omitted below.

A variation of the rack and pinion mechanism of an electric power steering apparatus according to the third preferred embodiment of the invention is described next below with reference to FIG. 28 to FIG. 30. It should be noted that like parts in this and the third embodiments are identified by like reference numeral, and further description thereof is omitted.

Figure 28:
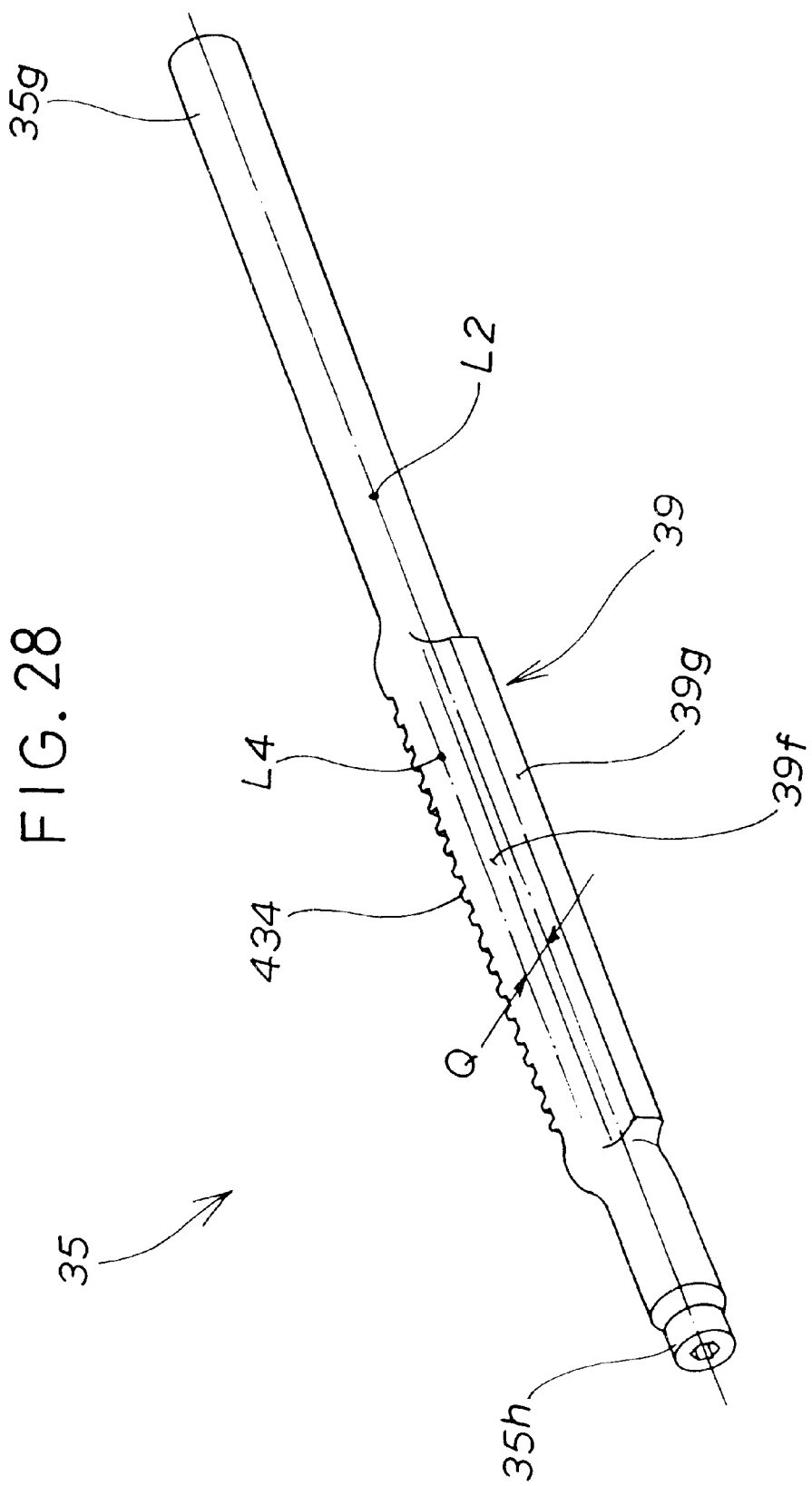
FIG. 28 is a perspective view of a first variation of the third embodiment.

FIG. 28 is a perspective view of a first variation of the rack shaft.

In a rack shaft 35 according to this first variation, the center L4 of rack formation part 39 where rack 434 is formed is offset distance Q to the rack 434 side from center L2 of right and left ends 35g and 35h supported by housing 41 (see FIG. 21).

Figure 29:
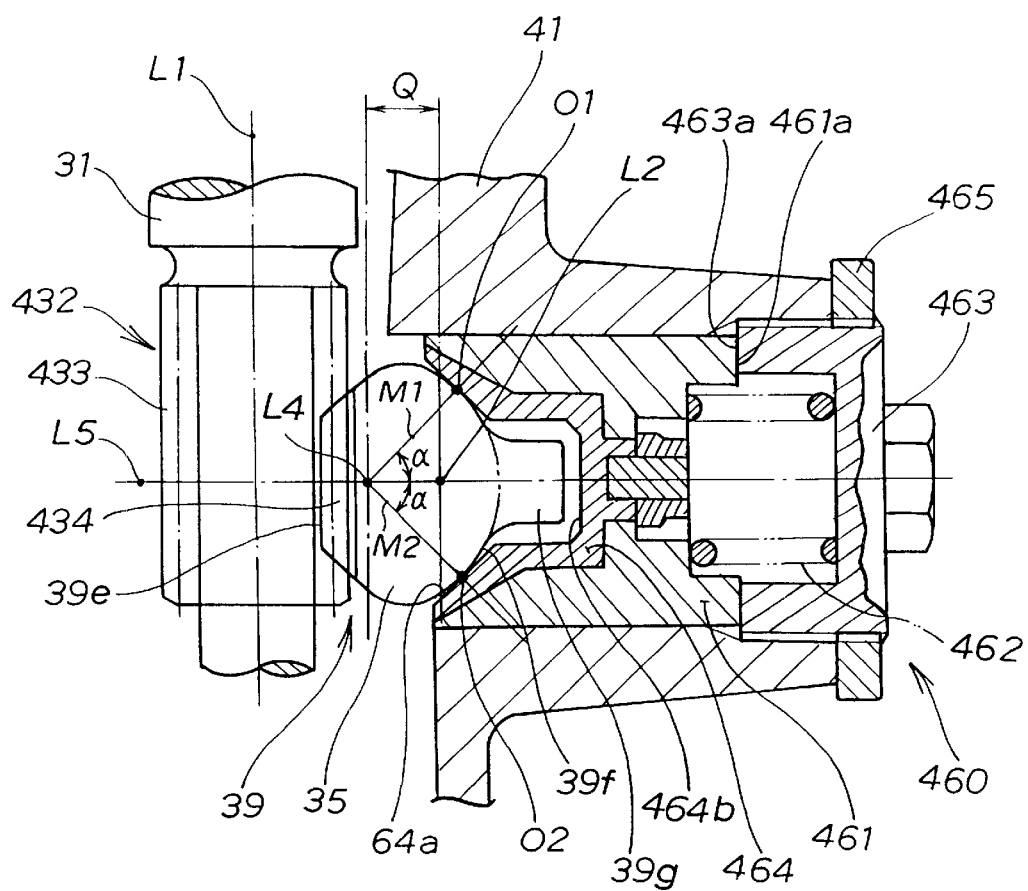
FIG. 29 is a sectional view of the rack and pinion mechanism and rack guide using the rack shaft shown in FIG. 28.

FIG. 29 is a section view of the rack and pinion mechanism and rack guide in the electric power steering apparatus according to this variation of the fourth embodiment. The back of flat 39e where rack 434 is formed on rack formation part 39 combines a curved convex surface 39f of which the center of the arc is point L4, that is, center L4 of rack shaft 35, and extending therefrom a rectilinear protrusion 39g extending to the back, that is away from pinion 433, along reference line L5.

The concave end 464a has a tapered shape with two flat surfaces contacting the curved back 39f at first and second contact points 01 and 02. These two flat surfaces are thus tangent to the curved back 39f at first and second contact points 01 and 02. A center recess 464b is formed in the center of this taper to accommodate rectilinear protrusion 39g.

Figure 30:
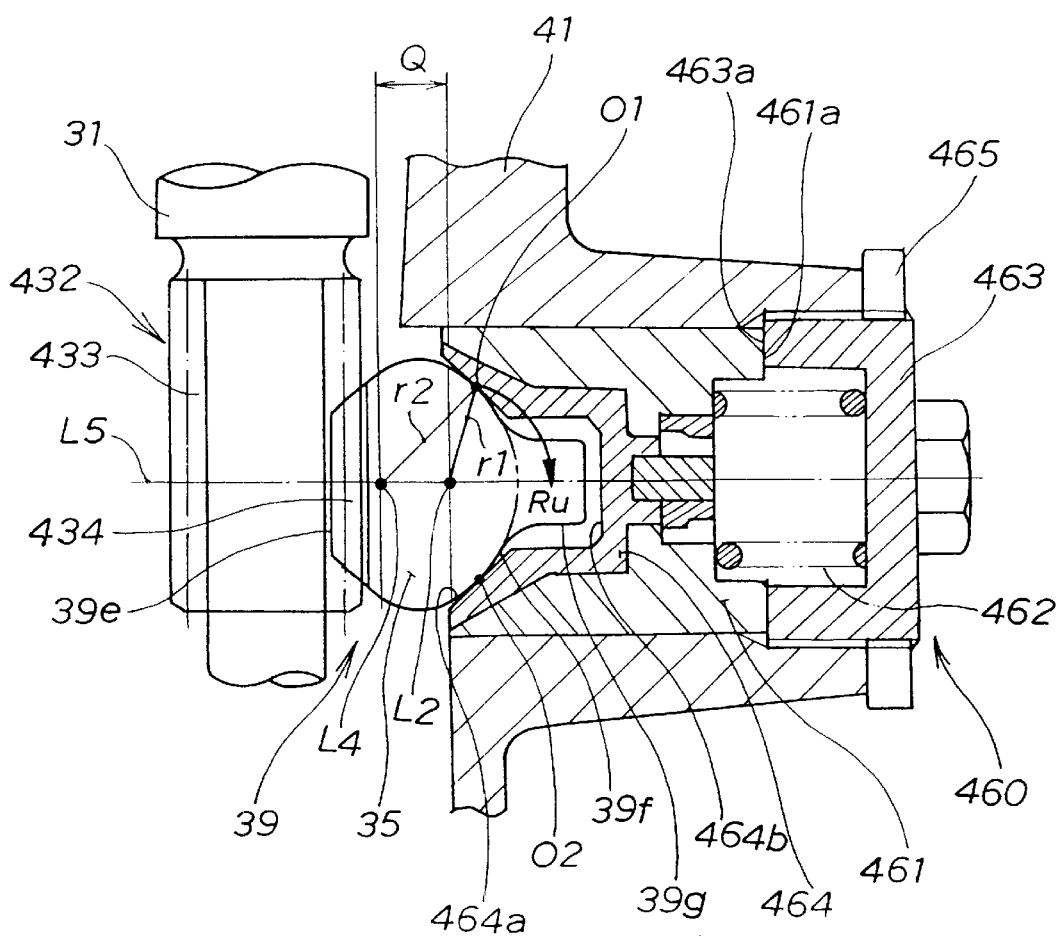
FIG. 30 is a sectional view showing the action of the rack and pinion mechanism and rack guide shown in FIG. 29.

As shown in FIG. 30 and described above in the third embodiment with reference to FIG. 27, the positions of first and second contact points 01 and 02 are set relative to center L2 of rack shaft 35 supported by housing 41 so that rocking of the convex part (back 39f) of rack shaft 35 is limited at concave end 464a when a rocking force acts on the rack shaft 35.

The position of center L4 of rack formation part 39 is offset distance Q toward rack 434 from center L2 of rack shaft 35 supported by housing 41. Rocking radius r1 is therefore less than arc radius r2 (r1<r2).

When rack shaft 35 attempts to roll clockwise as seen in the figure from center L2 (in the direction of arrow Ru), back 39f is limited by concave end 464a at contact point $O_1$. Rack shaft 35 is therefore unable to rock. Likewise when rack shaft 35 attempts to roll counterclockwise as seen in the figure from center L2, back 39f is limited by concave end 464a at contact point $O_2$. Rack shaft 35 is again therefore unable to rock.

The rack shaft 35 is thus housed so that it can slide longitudinally to housing 41 but cannot rock therein.

FIG. 31 shows a further variation of the first variation shown in FIGS. 28 to 30. The second variation is characterized by contact 464A being rotatably supported on guide member 461 by way of intervening spindle 467. This contact 464A replaces contact 464 shown in FIG. 37. This contact 464A is a rotating body supported rotatably on spindle 467, which is disposed parallel to center L1 of pinion 433. Tapered concave end 464a is formed around the outside of contact 464A.

Fourth Embodiment

Figure 32:
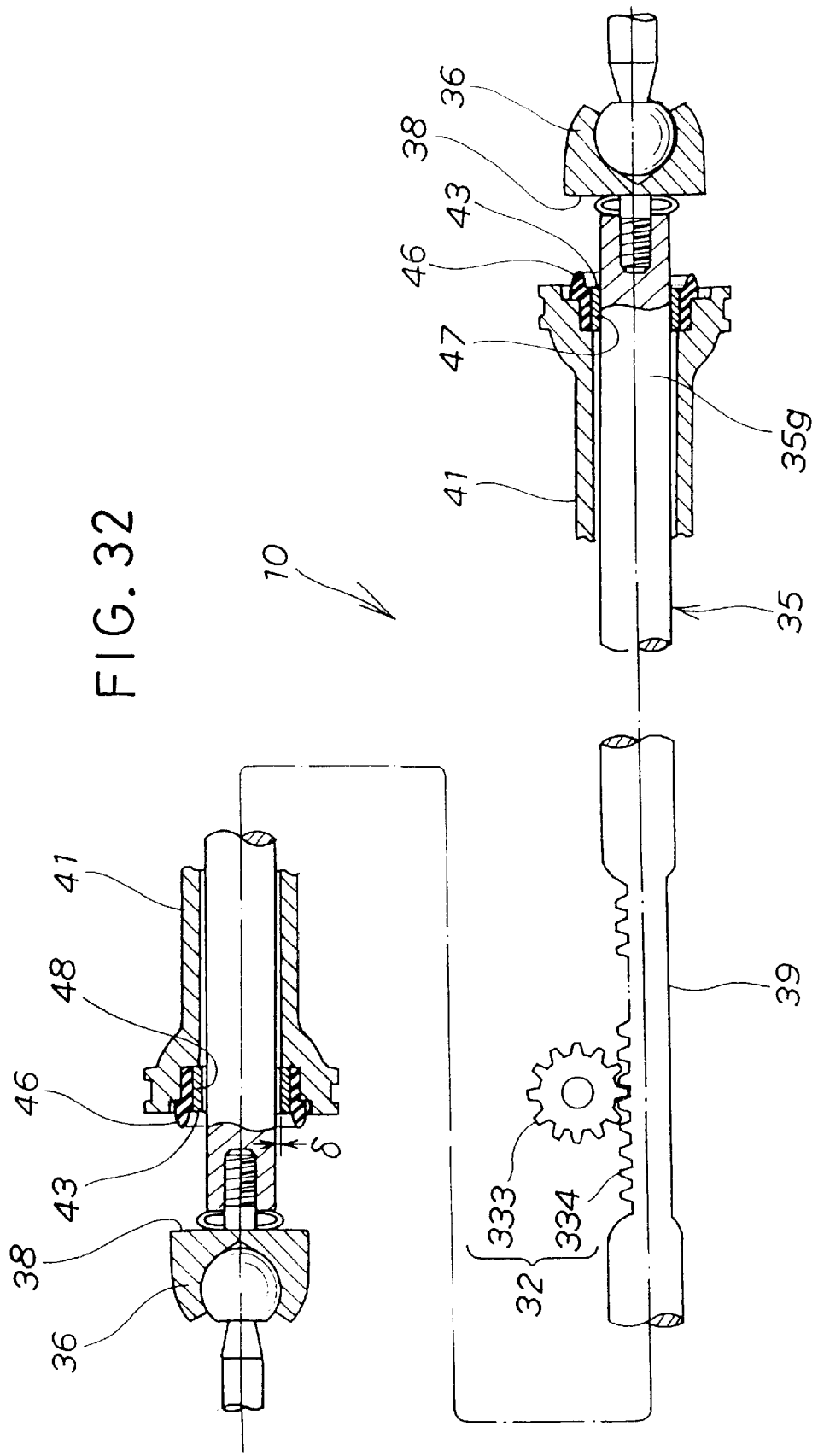
FIG. 32 is a sectional view of the rack shaft in a fourth embodiment of the present invention wherein the part of the rack shaft where the rack is formed and the part where the rack is not formed are coaxial.

FIG. 32 is a section view of the rack shaft 35 in an electric power steering apparatus according to a fourth preferred embodiment of the invention described below. FIG. 32 is comparable to FIG. 23 of the third embodiment above.

While center L4 of rack formation part 39 in the rack shaft 35 according to the fourth embodiment is offset distance Q from rack shaft 35 center L2 away from the rack formation surface, the rack shaft 35 in the third preferred embodiment of the present invention is characterized by center L2 of rack shaft 35 being coaxial to the center of rack formation part 39.

Housing 41 houses rack shaft 35 slidably therein in the longitudinal direction. End 35g of rack shaft 35 is supported by first bearing 47 of housing 41. Second bearing 48 of housing 41 supports the other end 35h of rack shaft 35 with a slight gap δ therebetween.

The rack shaft 35 of the fourth preferred embodiment is identical in form, function, and effect to the rack shaft 35 of the second embodiment shown in FIG. 14 and FIG. 15. That is, tooth width W1 of rack 34 formed on rack shaft 35 is greater than diameter D1 of support part 35g as shown in FIG. 14 and FIG. 15.

The procedure for manufacturing this rack shaft 35 is also identical to the procedure shown in FIG. 16.

The pinion and rack of this rack and pinion mechanism are helical gears identical to the pinion 33 and rack 34 of the first embodiment shown in FIG. 7A to FIG. 7D.

Figure 33:
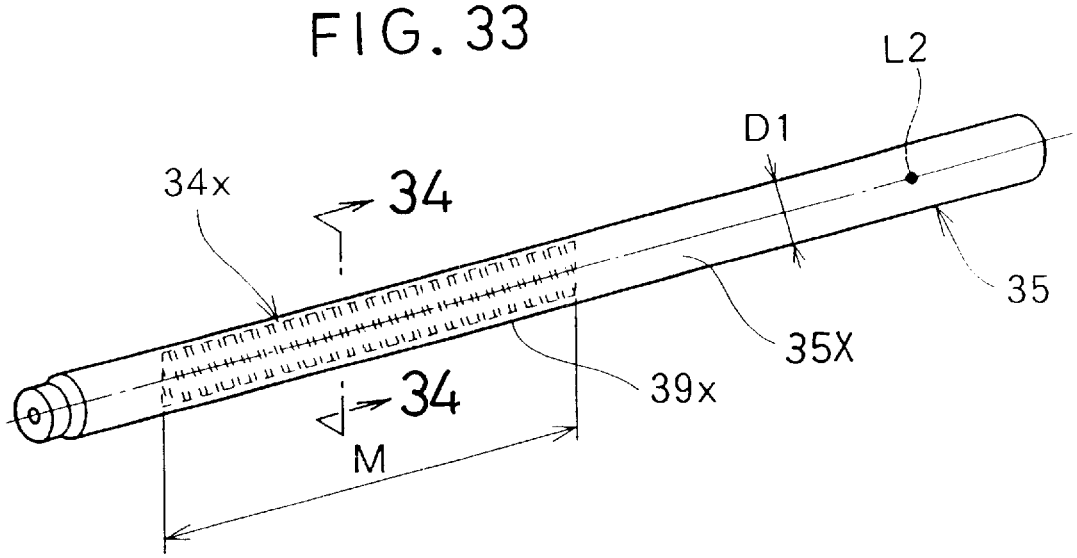
FIG. 33 is a perspective view of a rack shaft shown for comparison with the rack shaft of the fourth embodiment.
Figure 35:
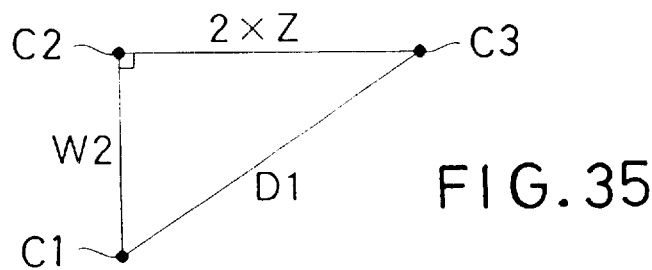
FIG. 35 illustrates how the rack tooth width shown in FIG. 34 is obtained.

Next, action of the rack shaft according to this preferred embodiment (that is, the rack shaft shown in FIGS. 14 and 15) is compared with the reference shaft shown in FIGS. 33 and 35.

The rack shaft 35 shown in FIG. 33 is a straight rod having a supported part 35x supported by the housing and a rack formation part 39x where rack 34x is formed. The supported part 35x has a circular section of diameter D1. M is the length of rack formation part 39x, and L2 is the center of rack shaft 35.

Figure 34:
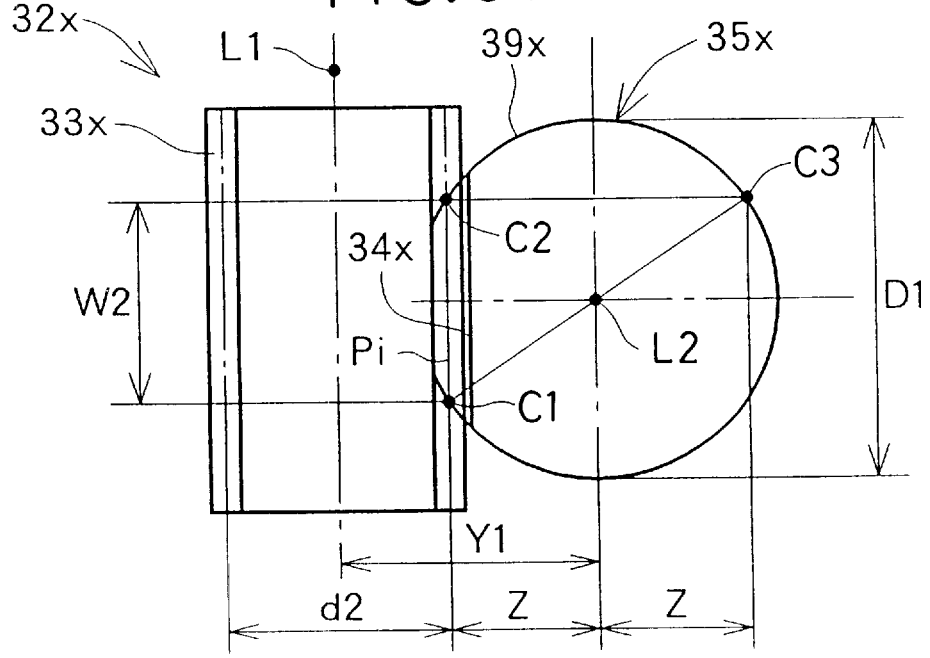
FIG. 34 is a sectional view taken along line 34—34 of FIG. 33.

FIG. 34 shows pinion 33x meshed with rack 34x. The rack formation part 39x has a circular section of the same diameter as supported part 35x. Note that tooth width W2 of rack 34x is determined by the distance Z from center L2 to the reference pitch line Pi of the rack 34x. It will also be obvious that width W2 is less than the diameter D1 of supported part 35x (W2<D1).

The pitch circle diameter of pinion 33x is d2, and the distance from center L1 of pinion 33x to center L2 of rack shaft 35 is Y1.

In the sectional view of rack formation part 39x shown in FIG. 34 let points C1 and C2 be the end points of the rack tooth width on reference pitch line Pi of rack 34x, and let point C3 be the intersection between the outside circumference (arc) of rack formation part 39x and a line passing through point C2 perpendicular to reference pitch line Pi. Point C3 is also at the intersection of a line passing through point C1 and center L2 of the section (rack shaft 35). The triangle of which the vertices are C1, C2, and C3 is therefore a right triangle. The length of side C1-C2 is W2, the length of side C2-C3 is (2 * Z), and the length of side C1-C3 is diameter D1.

FIG. 35 shows this right triangle of vertices C1, C2, and C3. It will be obvious that the length W2 of side C1-C2 can be obtained using the following equation.

$$W2=\sqrt{(D1)^2-(2\times Z)^2}$$

As previously described, tooth width W1 of the rack 34 shown in FIG. 15 is greater than the diameter D1 of end 35g (supported part), that is, W1>D1. If the diameter D1 of supported part 35g in FIG. 15 is equal to diameter D1 of supported part 35x in the comparative rack shaft shown in FIG. 34, then tooth width W1 of the rack 334 in the present embodiment is greater than the tooth width W2 of the rack 34x in this comparison.

Thus, in the present embodiment as shown in FIG. 15, rack formation part 39 is formed so that tooth width W1 of rack 334 is greater than the hypothetical tooth width W2 of rack 334, which is determined by the dimension specified for distance Z, which is the distance from center L2 to the reference pitch line Pi of the rack 334, when rack formation part 39 is assumed to be coaxial to center L2 of supported part 35g and have the same diameter (D1) as the supported part 35g. Tooth width W1 in the embodiment shown in FIG. 15 is approximately 1.5 times tooth width W2 of the comparison shown in FIG. 34.

Because the tooth width W1 of rack 334 is increased as shown in FIG. 15, the mechanical strength (bending strength and bearing strength) of rack 334 is significantly improved. Because the part of rack shaft 35 where rack 334 is not formed must be able to slide in order to turn the steered wheels, it must have the same rigidity as a conventional rack shaft Therefore, only tooth width W1 of rack 334 is increased in rack shaft 35, and thickness T1 is decreased an equivalent amount. Because thickness T1 of rack formation part 39 is less than diameter D1 of rack shaft 35, the rack formation part 39 is offset from center L2 of rack shaft 35 toward the pinion 333. As a result, the section area of rack formation part 39 is substantially equal to the section area of rack shaft 35, and there is substantially no change in the weight of rack shaft 35 even though rack tooth width W1 is greater than rack shaft diameter D1. It is therefore possible to limit the weight of rack shaft 35.

As will be obvious from the above, the weight of rack shaft 35 can be limited while at the same time increasing the mechanical strength (bending strength and bearing strength) of the rack 334 as a result of increasing the tooth width W1 of the rack 334.

It should also be noted that even if rack guide 60 pushes toward pinion 333 as shown in FIG. 13 from the side opposite rack 334, there is no practical effect on the bending rigidity of rack shaft 35 as a result of reducing thickness T1.

FIG. 36 and FIG. 37 show a variation of the rack shaft 35 shown in FIG. 14 and FIG. 15.

The rack shaft 35 shown in FIG. 36 is a round rod having a rack formation part 39A formed in a longitudinal section thereof. Note that the diameter of this rack formation part 39A is greater than diameter D1 of the rack shaft 35. That is, the rack shaft 35 has a small diameter end part 35g whereby rack shaft 35 is supported on housing 41 (see FIG. 32), and a larger diameter rack formation part 39A where rack 334 is formed. Note that diameter D1 of end part 35g is less than diameter D2 of the rack formation part 39A (D1<D2). The rack shaft center L2 is also the center of the end part 35g and rack formation part 39A.

As shown in FIG. 37, a rack formation flat 39e is formed to part of rack formation part 39A, and rack 334 is formed on this flat 39e. The tooth width W3 of rack 334 is less than diameter D1 of end part 35g (W3<D1). By increasing the diameter only at the rack formation part 39A of rack shaft 35, the overall weight of rank shaft 35 can be limited. Note, further, that this rack shaft 35 can be manufactured using a forging technique as described above.

In the variation shown in FIG. 36 and FIG. 37, rack formation part 39A is formed so that tooth width W3 of rack 334 in this variation is greater than the hypothetical tooth width W2 of rack 334, which is determined by the dimension specified for distance Z, which is the distance from center L2 to the reference pitch line Pi of the rack 334, when rack formation part 39A is assumed to have the same diameter (D1) in the section perpendicular to the longitudinal axis as the supported part 35g. By thus increasing the tooth width W3 of rack 334 in the rack shaft 35 according to this variation, the mechanical strength (bending strength and bearing strength) of rack 334 is increased while also limiting the weight of rack shaft 35.

Obviously, various minor changes and modifications of the present invention are possible in the light of the above teachings. It is therefore to be understood that within the scope of the appended claims the invention may be practiced otherwise than as specifically described.

What is claimed is:

1. An electric power steering apparatus comprising:
   a motor for producing an assist torque in accordance with a steering torque;
   a rack and pinion mechanism for a steering system, said rack and pinion mechanism having a rack and a pinion; and
   a geared reduction mechanism for transferring the assist torque to said rack and pinion mechanism, wherein
      said pinion and said rack of said rack and pinion mechanism are both helical gears,
      said pinion having a helix angle set to be less than a friction angle of said helical gears,
      one of said helical gears having a tooth profile wherein at least an addendum thereof is a circular arc generally centered on a reference pitch line, and
      the other of said helical gears having a tooth profile wherein at least a dedendum thereof is a circular arc generally centered on the reference pitch line.

2. An electric power steering apparatus as defined in claim 1, further comprising a torque limiter intervening between said motor and said geared reduction mechanism.

3. An electric power steering apparatus as defined in claim 1, further comprising a steering torque sensor for detecting a steering torque, said steering torque sensor being a magnetostrictive sensor for detecting magnetostriction of a pinion shaft of said rack and pinion mechanism.

4. An electric power steering apparatus as defined in claim 1, wherein said geared reduction mechanism comprises a combination of a driver gear and a driven gear,
   tooth surfaces of said driver gear, or tooth surfaces of said driven gear, or both, being coated with a low friction material coating, and
   said driver gear and said driven gear meshing with each other with no backlash.

5. An electric power steering apparatus as defined in claim 1, wherein said pinion and/or said rack of said rack and pinion mechanism is formed from a forging or other plastically processed part.

6. An electric power steering apparatus as defined in claim 1, wherein a rack shaft to which said rack is formed is arranged such that a back on a side opposite that to which said rack is formed is pushed toward said pinion by an adjustment bolt by way of an intervening rack guide member and a compression spring, the back of said rack guide member being pushed directly by said adjustment bolt when said pinion and said rack mesh with each other.

7. An electric power steering apparatus as defined in claim 1, wherein said rack shaft on which said rack is formed is made from a pipe stock.

8. An electric power steering apparatus as defined in claim 1, wherein said rack shaft on which said rack is formed is housed unrockably and slidably in a housing longitudinally thereof.

9. An electric power steering apparatus as defined in claim 8, wherein a back of said rack shaft opposite the surface on which said rack is formed is convex, and
   a rack guide is disposed having a concave end for contacting said convex back at contact points and pushing said convex back of said rack shaft toward said rack,
   said contact points being set in relation to said rack shaft supported by said housing so that said concave end limits rocking of said convex part of said rack shaft when a rocking force acts on said rack shaft, and said rack shaft is thereby housed unrockably in said housing.

10. An electric power steering apparatus as defined in claim 9, wherein said rack guide pushes said guide member having said concave end to said rack shaft side by means of an adjustment bolt through an intervening compression spring, said adjustment bolt pushing directly on a back of the surface to which said concave end is formed to said guide member when said pinion and said rack mesh.

11. An electric power steering apparatus as defined in claim 1, in which a supported part whereby said rack shaft is supported on a housing by way of intervening bearings, and a rack formation part to which said rack is formed, are disposed on said rack shaft, wherein:

when a section perpendicular to the axis of said rack formation part is a circular section equal in diameter to said supported part, and the distance from the center of said circular section to the reference pitch line is set to a specific dimension the actual tooth width of said rack is greater than the rack tooth width determined by the specific dimension.

12. An electric power steering apparatus as defined in claim 11, wherein the tooth width of said rack formed on said rack shaft is greater than the diameter of said rack shaft in that part where said rack is not formed.

* * * * *